United States Patent

Yamashita et al.

Patent Number: 6,014,695
Date of Patent: Jan. 11, 2000

[54] COMPUTER NETWORK SYSTEM FOR PACKET-TRANSFERRING DATA BETWEEN COMPUTERS, NETWORK FILE SERVER IN COMPUTER NETWORK SYSTEM AND DATA TRANSFERRING METHOD THEREOF

[75] Inventors: Hirofumi Yamashita, Kawasaki; Yoshihiro Takiyasu, Kodaira; Mitsuo Asai, Higashimurayama; Nozomu Hirose, Yokohama; Miho Iwanaga, Ebina; Ryuichi Ohno, Yokohama; Takeshi Onodera, Kawasaki, all of Japan

[73] Assignee: Hitachi, Ltd., Tokyo, Japan

[21] Appl. No.: 08/971,899

[22] Filed: Nov. 17, 1997

[30] Foreign Application Priority Data

Nov. 19, 1996 [JP] Japan .................................. 8-307720

[51] Int. Cl.⁷ ..................................................... G06F 15/16
[52] U.S. Cl. ........................... 709/219; 709/217; 709/216; 709/203; 710/52
[58] Field of Search ..................................... 709/219, 216, 709/217, 203; 710/52

[56] References Cited

U.S. PATENT DOCUMENTS

| | | | |
|---|---|---|---|
| 5,121,480 | 6/1992 | Bonke et al. | 711/2 |
| 5,163,131 | 11/1992 | Row et al. | 709/202 |
| 5,394,526 | 2/1995 | Crouse et al. | 709/219 |
| 5,737,495 | 4/1998 | Adams et al. | 707/104 |
| 5,802,366 | 9/1998 | Row et al. | 709/303 |
| 5,852,719 | 12/1998 | Fishler et al. | 709/216 |
| 5,913,028 | 6/1999 | Wang et al. | 709/203 |
| 5,915,094 | 6/1999 | Houloheris et al. | 709/219 |

*Primary Examiner*—Dung C. Dinh
*Assistant Examiner*—Abdullahi E. Salad
*Attorney, Agent, or Firm*—Beall Law Offices

[57] ABSTRACT

When an access request is generated from a client in a network file server comprising a computer including a communication controller connected to at least one client through a network and transferring information on a plurality of addresses inside a main storage device as one packet to at least one client, the main storage device having a buffer, a central processing unit and an input/output bus for mutually connecting the communication controller, the central processing unit and the main storage device, and a secondary storage device connected to the computer, an area for storing the data corresponding to this access request is allocated into the buffer of the main storage device. The data corresponding to the access request is read out from the secondary storage device, is transferred to the buffer and is stored in the allocated area. A header for the data in the allocated area in the buffer, the address and size of the header and the address and size of the data are generated in the main storage device on the basis of the access request. As the address and size of the header and the address and size of the data are reported to the communication controller, the data inside the allocated area in the buffer are transferred as one packet to at least one client by the communication controller.

24 Claims, 34 Drawing Sheets

FIG.22

RESOURCE TABLE 190

| MAXIMUM BAND |
| BAND UNDER USE AT PRESENT |
| MAXIMUM USABLE BAND PER CLIENT |
| MAXIMUM NUMBER OF CONNECTABLE CLIENTS |
| NUMBER OF CLIENTS CONNECTED AT PRESENT |

COMPUTER NETWORK SYSTEM FOR PACKET-TRANSFERRING DATA BETWEEN COMPUTERS, NETWORK FILE SERVER IN COMPUTER NETWORK SYSTEM AND DATA TRANSFERRING METHOD THEREOF

BACKGROUND OF THE INVENTION

This invention relates to a computer network system in which a plurality of computers are connected through a network and data are packet-transferred between the computers, to a network file server in the computer network system and to a data transfer controlling method thereof.

Drastic progresses have been made in recent years in the improvement of a high speed operation of CPUs (Central Processing Units), a large capacity of magnetic disks and reduction of their cost of production, and a high speed operation of networks, and constitution of client-server systems for connecting one or more computers through a network and operating them cooperatively have been vigorously attempted. In such client-server systems, the data is stored in the server and the client can gain access to the data stored in the server by making access to the server. The systems of this kind provide the advantage that a plurality of clients can share the data of the server.

On the other hand, large quantities of images and sounds can now be handled easily by a computer in the field of multimedia communication due to the progress of digitization technologies of the images and the sounds and due also to the progress of compression technologies as described, for example, in "Media Processing: A New Design Target", IEEE MICRO, August, 1996, pp. 6–9. For this reason, a digital studio system which handles the images and the sounds as digital information by personal computers (PCs) or workstations (WSs) and edits and casts the digital information has become wide spread, as described in "Nikkei Multimedia", August, 1995, p. 86, for example.

The digital studio system is the system which conducts efficient image edition by the PC or the WS using a random accessible magnetic disk in place of image edition using tapes according to the prior art. At present, however, such a PC or a WS has been constituted into a stand-alone system, that is, a system that does not share data with other digital studio apparatuses. Nonetheless, the form of the client-server system is more preferred to the stand-alone system in view of the fact that the edition work of the images is not carried out by only one editor and the edition result is shared preferably by a greater number of parties as possible. Because the digital studio system uses a standard file access interface such as a file access function defined by "The C Programming Language Second Edition", 1988, p. 169–174 or "Win 32 System Services: The Heart of Windows 95 & Windows NT", 1996, p. 24, for example, a network file system (NFS) must be used in order to convert the digital studio system to the client-server system. An example of the network file system is the NFS. This NFS is described in Hal Stern "NFS & NIS", published by K. K. Askie, 1992, p. 184.

The network file system comprises clients, a server and a network for connecting them, and the server includes a main storage device, a secondary storage device, and so forth.

When a file access request is generated from the client to the server in the network file system according to the prior art, the server prepares a buffer for the secondary storage device in the main storage device, reads out the data corresponding to the access request from the secondary storage device and stores the data in the buffer for the secondary storage device. Next, to transfer the data stored in the buffer for the secondary storage device to the client through the network, a header comprising a data transfer length, a target machine ID such as an ID of the requesting client, etc., is added to the data in the form of a packet and then this packet is transferred to the client through the network. In this instance, in order to shape the packet form, a buffer for the packet is prepared on the main storage device separately from the buffer for the secondary storage device, and the header information is first described into the buffer for the packet comprising a continuous physical address space inside the main storage device. Next, the data in the buffer for the secondary storage device is copied to the remaining areas in the buffer for the packet. In consequence, in the buffer for the packet, the header and the data are arranged in the continuous physical space inside the main storage device and can be transferred as the packet data to the network.

SUMMARY OF THE INVENTION

However, when the network file system according to the prior art is applied to the digital studio system, the following problem of performance develops. In other words, the data handled in the digital studio system are video data and sound data to which real time access in large data quantities must be made within a short time, though the required time depends on their quality. In the conventional network file system, however, the data must be copied from the buffer for the secondary storage device to the buffer for the packet as described above, and overhead is great in this instance. Because of such a large overhead, the packet transfer rate of the data from the server to the client becomes low and the real time access of large quantities of data such as the video data and the sound data is not possible in practice.

It is therefore an object of the present invention to provide a computer network system which can solve the problems of the prior art described above, a network file server in this computer network system an its data transfer controlling method.

It is another object of the present invention to provide a computer network system which can be applied to large quantities of data requiring the real time access such as the video data and the sound data in a digital studio system by reducing the number of times of data copy operation to be carried out when data is read out from a secondary storage device to generate a packet, and by improving a data transfer rate from a server to a client, a network file server in this computer network system and its data transfer controlling method.

To accomplish the objects described above, according to one aspect of the present invention, there is provided a network file server connected to at least one client through a network which includes a secondary storage device and a computer connected to the secondary storage device through an input/output bus, wherein the computer includes a main storage device connected to the secondary storage device through the input/output bus; a central processing unit connected to the secondary storage device and to the main storage device through the input/output bus; and a communication controller connected to the main storage device through the input/output device, connected also to at least one client through the network, accepting a file access request sent from this at least one client through the network and executing the data transfer of information on a plurality of addresses inside the main storage device as one packet to at least one client; wherein the main storage device includes a buffer; a file access request control portion for accepting the file access request sent from the communication controller through the input/output bus, allocating an area inside the buffer for storing data corresponding to the file access request in response to this file access request, generating an access request to a secondary storage device access control portion, giving further a communication request to a data transfer control portion and executing the data transfer between the communication controller and the secondary storage device; the secondary storage device access control portion for reading out the data from the secondary storage device in accordance with the access request from the file access request control portion and transferring the data to the allocated area in the buffer through the input/output bus; and the data transfer control portion for generating a header for the data in the allocated area of the buffer on the basis of the communication request from the file access request control portion, sending the address and size of the header so generated and the address and size of the data in the allocated area of the buffer to the communication controller through the input/output bus, and generating a communication request to the communication controller so that the header and the data can be collectively transferred to the at least one client; and wherein the communication controller reads out the data in the allocated area of the buffer in accordance with the communication request from the data transfer control portion, reads out also the header generated in the data transfer control portion, generates one packet from the data and the header, which are so read out, on the basis of the address and size of the header and the address and size of the data from the data transfer control portion, and executes the data transfer of this packet to the client through the network.

In the network file server of the present invention having the construction described above, when the client generates the file access request to the network server, the access request processing portion (network file system portion) of the network file server allocates the area inside the buffer in accordance with this access request, reads out the data of the file corresponding to the access request from the secondary storage device by means of the secondary storage device access control portion (file system portion) and transfers and stores the data in the allocated area of the buffer. When the data transfer from the secondary storage device to the buffer is finished, the network file system portion requires the ID of the client, the buffer address of the data, the data transfer length, etc., as parameters for the data transfer control portion (communication control portion) so that the data stored in the buffer can be transferred to the client. Receiving this request, the communication control portion generates the header comprising the ID of the client, the buffer address of the data, the data transfer length, etc., and generates the communication request to the communication controller by using the address of the header, its data size, the address of the data inside the buffer and the data size inside the buffer as a set when the generation of the header is completed. Then, the communication controller puts together the header and the data into one packet on the basis of the addresses and sizes of these header and data inside the buffer so set, and transfers the packet to the client through the network.

As described above, the communication control portion in the present invention generates the header, puts together the header address, the header data size, the address of the data inside the buffer and the size of the data inside the buffer to the set and generates the communication request to the communication controller. Therefore, the communication controller can generate the packet on the basis of the information and the data inside the buffer. In other words, the present invention does not require the operation of the prior art system which disposes the buffer for the packet separately from the buffer for the secondary storage device and copies the data from the buffer for the secondary storage device to the buffer for the packet, but can transfer the information on a plurality of addresses or in other words, can execute data transfer of the header and the data inside the buffer, that exist in mutually separate address spaces, as one packet. Namely, the present invention eliminates the necessity of the prior art system for especially preparing the buffer for the packet and generating the packet in one continuous address space in the buffer. As a result, the present invention can eliminate data copy for generating the packet. In this manner, the present invention can provide a computer network capable of executing a high speed data transfer, a network file server in this computer network system and its data transfer controlling method.

BRIEF DESCRIPTION OF THE DRAWINGS

FIG. 22 shows a resource table used in the third embodiment;

DESCRIPTION OF THE PREFERRED EMBODIMENTS

Hereinafter, preferred embodiments of the present invention will be explained with reference to the accompanying drawings.

Figure 1:
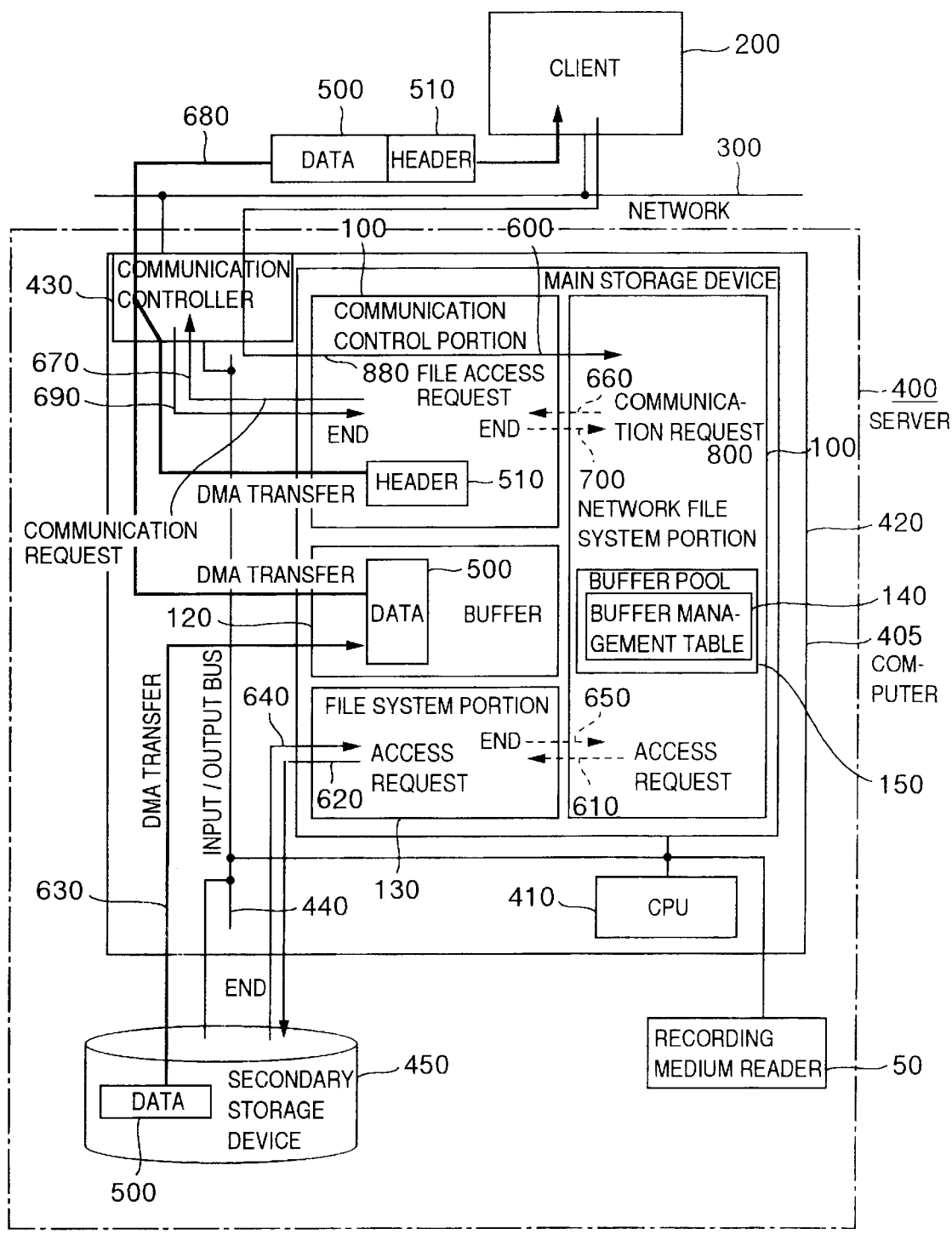
FIG. 1 is a block diagram showing a structure of a computer network system according to the first embodiment of the present invention.

FIG. 1 shows the first embodiment of the present invention. In the first embodiment of the present invention, clients 200 and a server 400 are connected to one another through a network 300. Though only one client is shown disposed in FIG. 1 to simplify the explanation, the present invention can be applied to the case where a plurality of clients are connected to the server through the network, too. As is obvious from FIG. 1, the server 400 includes a computer 405 and a secondary storage device 450 and the computer 405 comprises a CPU (Central Processing Unit) 410, a main storage device 420, a communication controller 430 and input/output buses 440 for connecting them. The communication controller 430 has a scatter-and-gathering function capable of collectively transferring information of a plurality of physical addresses on the main storage device 420. This scatter-and-gathering function is described, for example, in U.S. Pat. Nos. 5,251,303 and 5,497,476.

Figure 7:
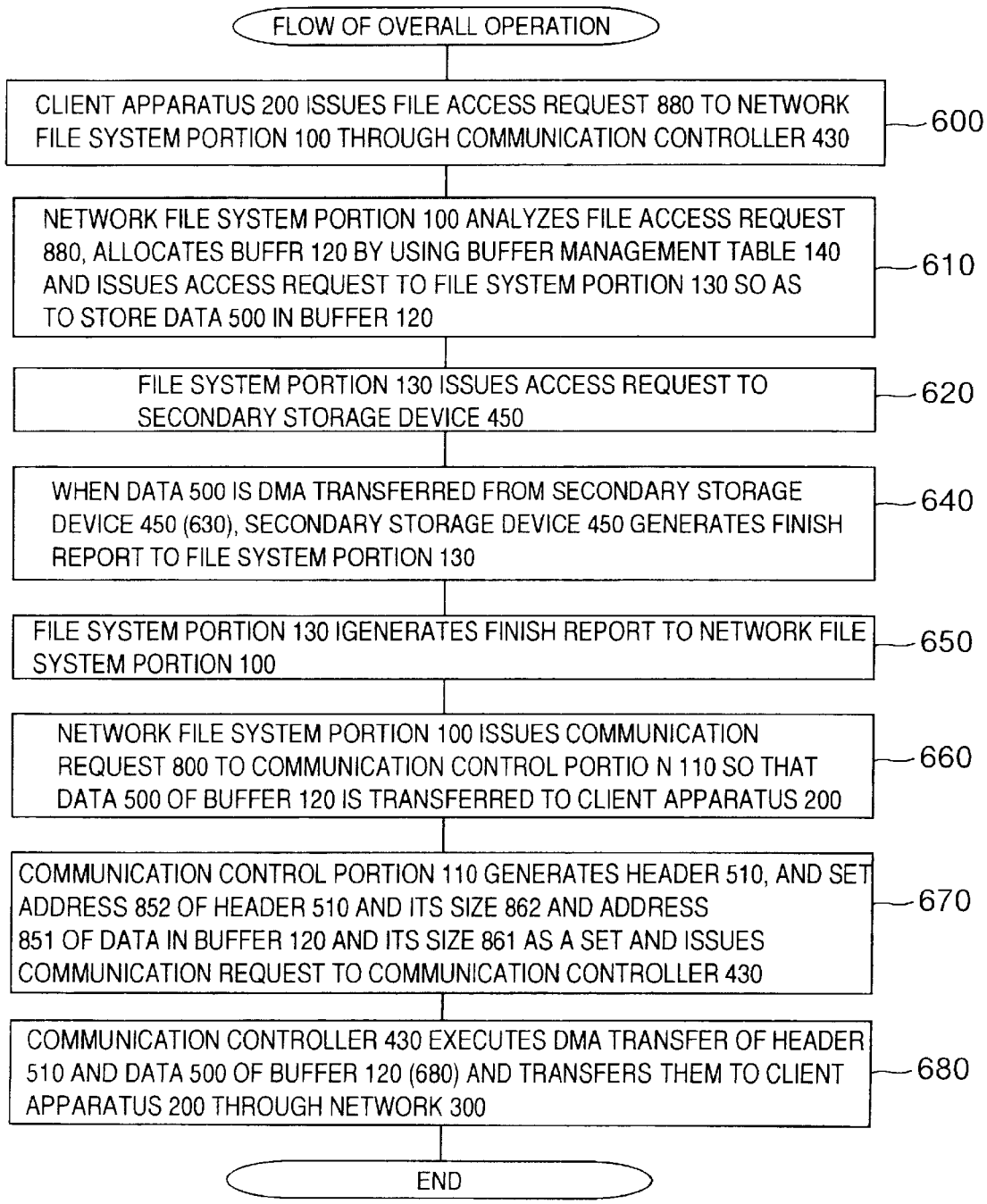
FIG. 7 is a flowchart useful for explaining the overall operation of the first embodiment.

In FIG. 1 as well as in the explanation that follows, reference numerals 600 to 680 represent the steps 600 to 680 corresponding to those shown in FIG. 7. Similarly, in later-appearing FIG. 5 as well as its associated explanation, reference numerals 601 to 700 correspond to the steps 601 to 700 shown in FIGS. 9 and 10. Similarly, in FIGS. 11 to 15 and their associated explanation, reference numerals 600 to 730 correspond to the steps 600 to 730 in FIGS. 16 to 20. Further, in FIGS. 21 and 24 and their associated explanation, reference numerals 740 to 750 correspond likewise to the steps 740 to 750 in FIG. 24. Furthermore, in FIGS. 25, 27 to 29 and 33 to 34 and their associated explanation, the same reference numerals as those in FIG. 26, etc., correspond to the steps having the same reference numerals, respectively.

This embodiment is directed to provide a server 400 capable of offering high speed file access means to the clients 200. To this end, copy of the data as the access object inside the main storage device 420 of the server 400 is eliminated particularly when the data as the access object is transferred from the server 400 to the client 200.

Therefore, the server 400 includes inside the main storage device 420 a buffer 120 for storing the data 500 as the file access object read out from a secondary storage device 450, a secondary storage device access control portion (hereinafter called the "file system portion") 130, a data transfer control portion (hereinafter called the "communication control portion") 110 and a file access request control portion (hereinafter called the "network file system portion") 100. Here, each of the network file system portion 100, the file system portion 130 and the communication control portion 110 comprises a program module which operates on an operating system inside the CPU 410. Incidentally, each of these portions may comprise a hardware.

The network file system portion 100 includes a buffer management table 140 for managing the buffer 120, accepts a file access request 880 sent from the client 200 through the network 300 and the communication control portion 110, and allocates the area inside the buffer 120 for storing the data 500 corresponding to the file access request in accordance with this request, by using the buffer management table 140. Further, the network file system portion 100 generates (610) the access request to the file system portion 130 so as to execute DMA (Direct Memory Access) transfer of the data 500 in accordance with the file access request. The file system portion 130 generates the access request (620) to the secondary storage device 450 in response to the former access request, reads out the data 500 from the secondary storage device 450 and transfers it by the DMA transfer to the buffer 120. Thereafter the network file system portion 100 gives the communication request (660) to the communication control portion 110.

As described above, the file system portion 130 reads out the corresponding data 500 by gaining access to the secondary storage device 450 in accordance with the access request 610 from the network file system portion 100 and transfers it by the DMA transfer (680) to the allocated area on the buffer 120 through the input/output bus 440.

The communication control portion 110 generates a header 510 corresponding to the data 500 inside the buffer 120 on the basis of the communication request (660) from the network file system portion 100, generates a data transfer information table 832 (FIG. 4) of the header 510 on the basis of this header, and generates further a data transfer information table 831 (FIG. 4) of the data 500 on the basis of the data 500 inside the buffer 120. The communication control portion 110 sends the address and size of the header 510 and the address and size of the data 500 to the communication controller 130 through the input/output bus 440 on the basis of the contents of these tables 831 and 832 and generates a communication request (670) so that the header and the data can be collectively transferred as a packet to the client 200.

The communication controller 430 reads out the data 500 inside the buffer 120 in accordance with the communication request (670) from the communication control portion 110, reads out also the header 510 generated in the communication control portion 110, generates one packet from the data 500 and the header 510 so read out, and executes the data transfer (680) to the client 200 through the network 300.

The overall operation flow of this embodiment will be explained with reference to FIGS. 1 and 7.

First, the file access request 880 generated by the client 200 is applied to the network file system portion 100 inside the main storage device 420 through the network 300 and through the communication controller 430 at the step 600 (600).

Incidentally, the file access request 880 is given to the main storage device 420 through the communication controller 430 in this embodiment as well as in each of the following embodiments but it may be given through another communication controller disposed separately from the communication controller 430. The file access request 880 may be applied to the network file system portion 100 in the main storage device 420 through the communication control portion 110.

At the next step 610, the network file system portion 100 analyzes the file access request 880, allocates the area inside the buffer 120 for storing the data corresponding to the access request 880 by using the buffer management table 140 and generates the access request (610) so that the file system portion 130 reads out the data 500 from the secondary storage device 450 and stores it in the allocated area inside the buffer 120.

At the step 620, the file system portion 130 generates the access request (620) to the secondary storage device 450 in response to the access request (610).

At the step 640, the secondary storage device 450 reads out the data 500 in response to the access request (620), transfers it to the buffer 120 by the DMA transfer (630) and generates the finish report to the file system portion 130.

At the step 650, the file system portion 130 generates the finish report of the DMA transfer to the network file system portion 100 (650).

At the step 660, the network file system portion 100 generates the communication request 800 (650) to the communication control portion (110) in response to the finish report (650) of the DMA transfer so that the communication control portion transfers the data 500 of the buffer 120 to the client 200.

At the step 670, the communication control portion 110 generates the header 510 in response to the communication request 800, reports the physical address 852 of the header 510 and its size 862, and the physical address 851 of the data 500 inside the buffer 120 and its size 861, to the communication controller 430 and generates the communication request to the communication controller 430 (670).

At the step 680, the communication controller 430 transfers the header 510 and the data 500 of the buffer 120 as one packet by the DMA transfer to the client 200 (680) through the network 300.

Figure 2:
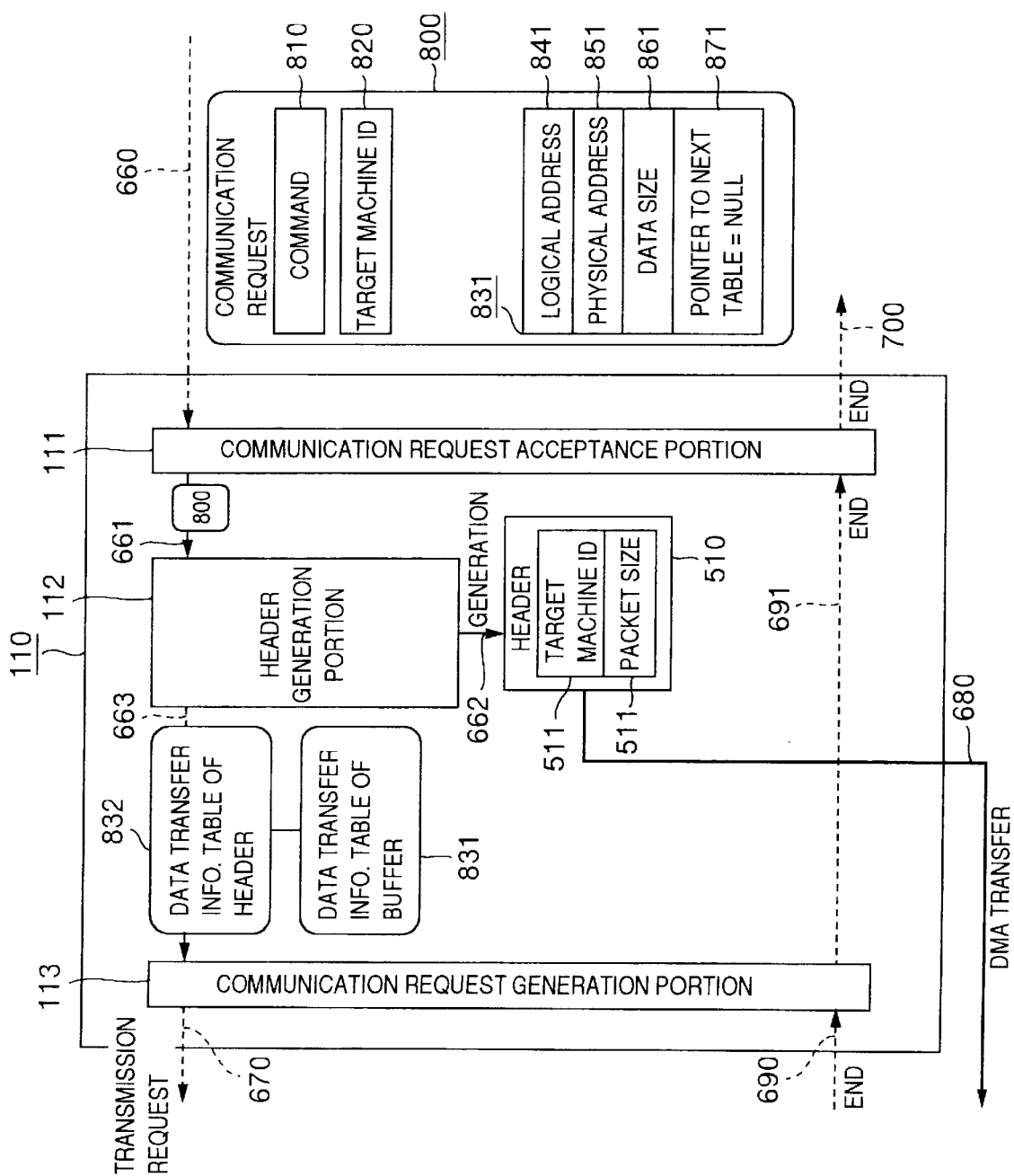
FIG. 2 is a block diagram showing a structural example of a communication control portion in the computer network system shown in FIG. 1.

FIG. 2 is a block diagram showing in detail an example of the communication control portion 110 capable of generating the header 510, etc., as shown at the step 670.

In FIG. 2, the communication control portion 110 comprises a communication request acceptance portion 111, a header generation portion 112 and a communication request generation portion 113. As shown in FIG. 2, the communication request 800 from the network file system portion 110 comprises three parameters, that is, a command 810, a target machine ID 820 (the term "target machine" hereby means the client) and a data transfer information table 831 on the data 500 inside the buffer 120 which has the format of a data transfer information table 830 shown in FIG. 3. The data transfer information table 830 shown in FIG. 3 comprises a logical address 840 of the information managed by the operating system inside the CPU 410 (the area or space on the main storage device), a physical address 850 of this information on the main storage device 420, the size 860 of this information and a pointer 870 to the next table which links with this table 830.

Figure 8:
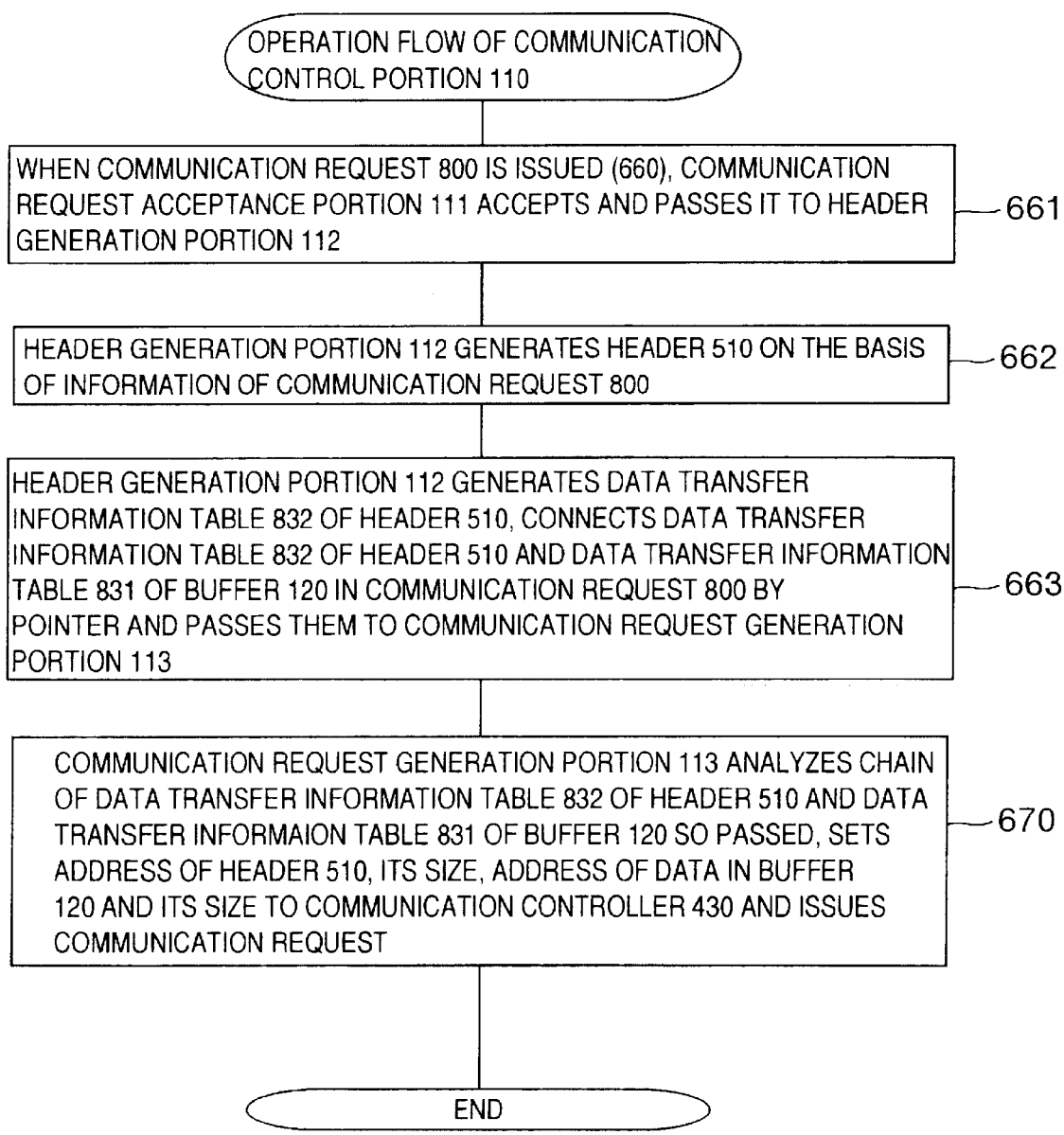
FIG. 8 is a flowchart useful for explaining the operation of the communication control portion in the first embodiment.

The operation of the communication control portion 110 shown in FIG. 2 will be explained with reference to the flowchart of FIG. 8.

First, at the step 661, when the communication request 800 is generated from the network file system portion 100 (step 660), the communication request acceptance portion 11 accepts the communication request 800 and delivers it to the header generation portion 112.

At the step 662, the header generation portion 112 generates the header 510 on the basis of the information of the communication request 800.

Figure 3:
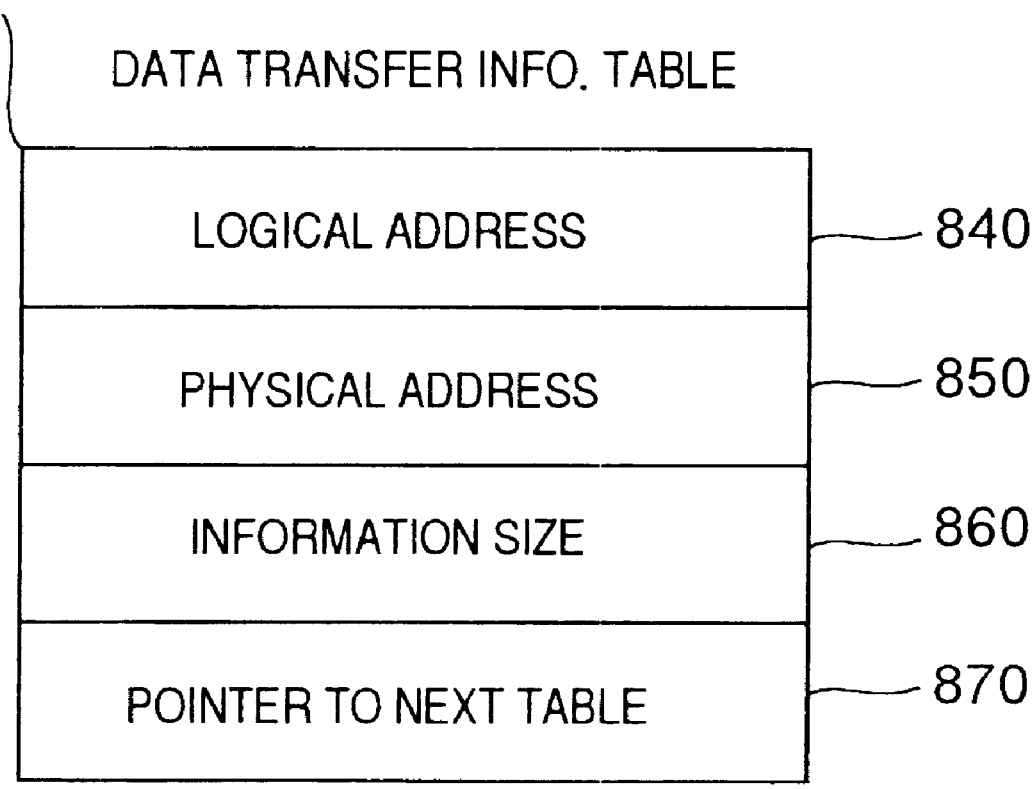
FIG. 3 shows a data transfer information table used in the first embodiment.
Figure 4:
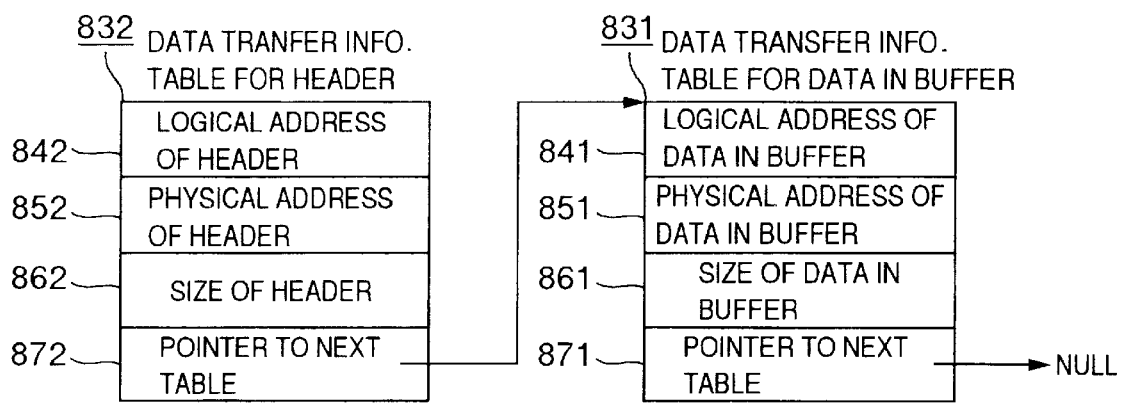
FIG. 4 shows a data transfer table for a header and a data transfer table for data linked with the header data transfer table.

At the step 663, the header generation portion 112 generates the data transfer information table 832 of the header 510. As shown in FIG. 4, the table transfer information table 832 for the header 510 has the format of the data transfer information table 830 shown in FIG. 3, and comprises a logical address 842 of the header 510 managed by the operation system inside the CPU 410, a physical address 852 of the header 510 on the main storage device 420, a size 862 of the header and a pointer 872 to the next table 831 which links with this table 832. The data transfer information table 832 for the header 510 and the data transfer information table 831 for the data inside the buffer 120 in the communication request 800 are connected by the pointer by storing the pointer of the buffer 120 to the data transfer information table 831 as the pointer 872 to the next table in the data transfer information table 832 for the header 510, and the tables 831 and 832 linked in this manner are delivered to the communication request generation portion 113. Incidentally, the structure of the data transfer information table 831 for the data shown in FIGS. 2 and 4 is the same as that of the data transfer information table 830 shown in FIG. 3, and comprises the logical address 841 of the data 500 managed by the operating system inside the CPU 410, the physical address 851 of this data on the main storage device 420, the size 861 of the data and the pointer 871 to the next table linked with this table 831. Incidentally, there is no next table which links with the data transfer information table 831 for the data in this case and for this reason, the pointer 871 to the next table is NULL.

At the next step 670, the communication request generation portion 113 analyzes the chain of the data transfer information table 832 for the header 510 handed over thereto and the data transfer information table 831 for the data inside the buffer 120, reports the physical address 852 of the header 510 and its data size 862 and the physical address 851 of the data inside the buffer 120 and its data size 861 to the communication controller 430 and further generates the communication request to the communication controller 430.

Figure 5:
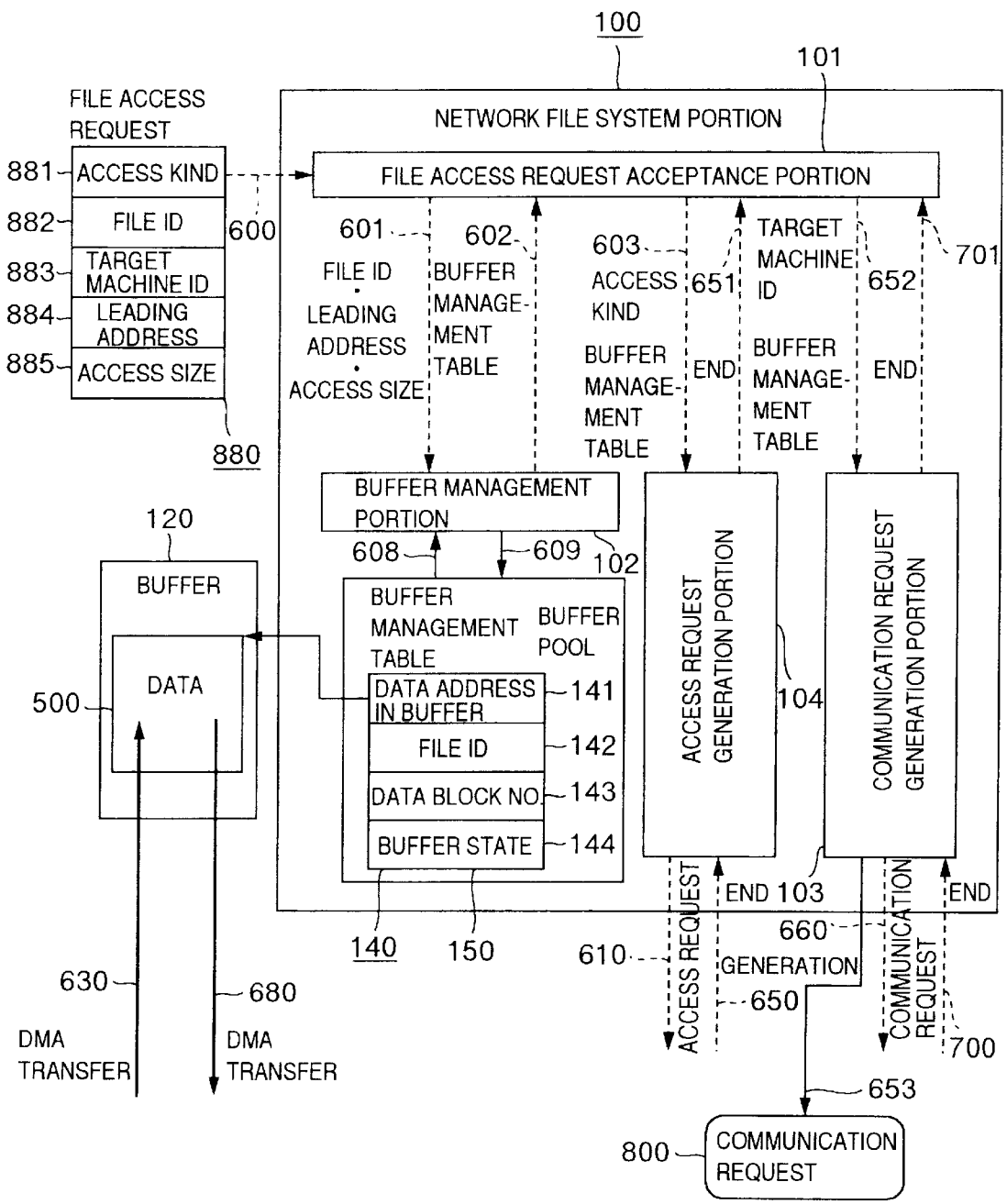
FIG. 5 is a block diagram showing a structural example of a network file system in the first embodiment.

Next, FIG. 5 shows in detail an example of the network file system portion 100 used in this embodiment. In FIG. 5, the network file system portion 100 comprises a file access request acceptance portion 101, a buffer management portion 102, an access request generation portion 104, a communication request generation portion 103 and a buffer pool 150 for managing a buffer management table 140.

A file access request 880 from a client 200 comprises five parameters, that is, an access kind classification 881 representing the kind of this file access request, an identification or ID 882 of the file as the access object, a target machine ID 883 (the term "target machine" hereby means the client), a leading address 884 of the file to which the access is to be made and an access size 885. A table comprising four members, that is, a logical address 141 of the data 500 inside the buffer 120 managed by the operating system, a file ID 142, a block number 143 of the data 500 inside the file as the access object and the status of the buffer (during reading, etc.) 144 is used as the buffer management table 140.

Figure 9:
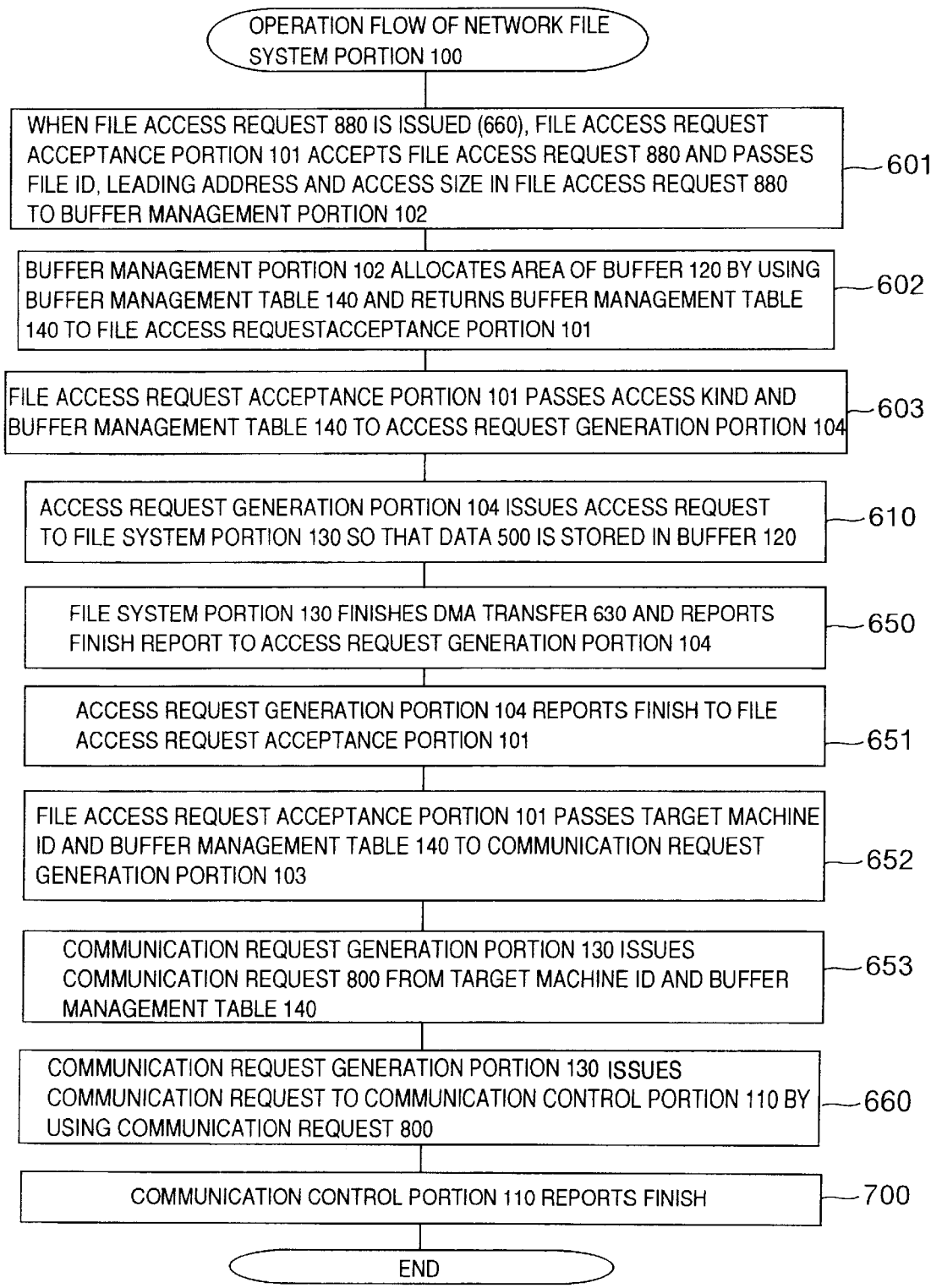
FIG. 9 is a flowchart useful for explaining the operation of the network file system portion in the first embodiment.

The operation of the network file system portion 100 shown in FIG. 5 will be explained with reference to the flowchart of FIG. 9.

At the initial step 601, when the file access request 880 is generated (660), the file access request acceptance portion 101 accepts the file access request 880 and delivers the file ID 882 inside the file access request 880, its leading address 884 and access size 885 to the buffer management portion 102.

At the step 602, the buffer management portion 102 generates the buffer management table 140 on the basis of the file ID 882, the leading address 884, the access size 885, etc., so delivered. The buffer management portion 102 allocates the areas for storing the data 500 inside the buffer 120 by using the buffer management table 140 and returns the buffer management table 140 to the file access request acceptance portion 101.

At the step 603, the file access request acceptance portion 101 delivers the access kind and the buffer management table 140 to the access request generation portion 104.

At the next step 610, the access request generation portion 104 generates the access request to the file system portion 130 so as to store the data 500 in the buffer 120.

At the step 650, the file system portion reads out the data 500 from the secondary storage device 450, executes the DMA transfer 630 to the buffer 120 and reports the finish report of the DMA transfer to the access request generation portion 104.

At the step 651, the access request generation portion 104 reports the finish report of the DMA transfer to the file access request generation portion 101.

Then, the file access request acceptance portion 101 delivers the target machine ID 882 and the buffer management table 140 to the communication request generation portion 103 at the step 652. Incidentally, the term "targer machine" means hereby the client.

At the step 653, the communication request generation portion 103 generates the communication request on the basis of the target machine ID 882 and the buffer management table 140.

At the step 660, the communication request generation portion 103 generates the communication request to the communication control portion 110 by using the communication request 800.

At the step 700, the communication control portion 430 executes the DMA transfer of the header 510. When this DMA transfer is finished, the communication control portion 110 reports the finish of the DMA transfer to the communication request generation portion 103.

Figure 6:
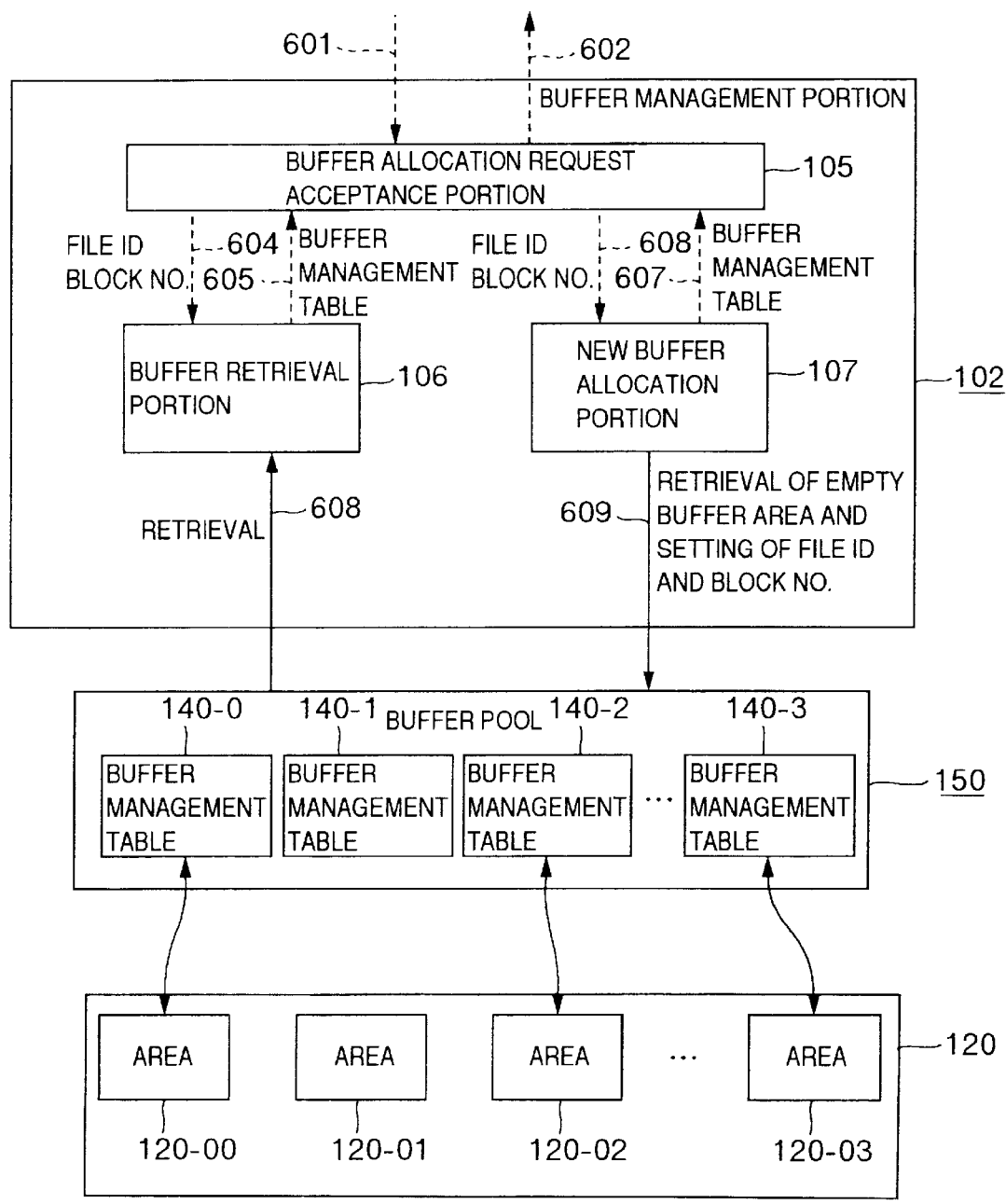
FIG. 6 is a block diagram showing a structural example of a buffer management portion in the first embodiment.

FIG. 6 shows an example of the buffer management portion 102 of the network file system portion 100 used in FIG. 5. In FIG. 6, the buffer management portion 102 comprises a buffer allocation request acceptance portion 105, a buffer retrieval portion 106 and a new buffer allocation portion 107. The buffer management table 140 is managed inside the buffer pool 150, and comprises a plurality (four, in this embodiment) of tables 140-0 to 140-3 in FIG. 6. These tables correspond to the data storage areas 120-00 to 120-03, respectively. Incidentally, the buffer management table 140 is not particularly limited to four tables and may be less than three or more than five. The data so read out as to correspond to the access requests are stored in this buffer storage area, and these areas are managed by the corresponding buffer management tables.

Figure 10:
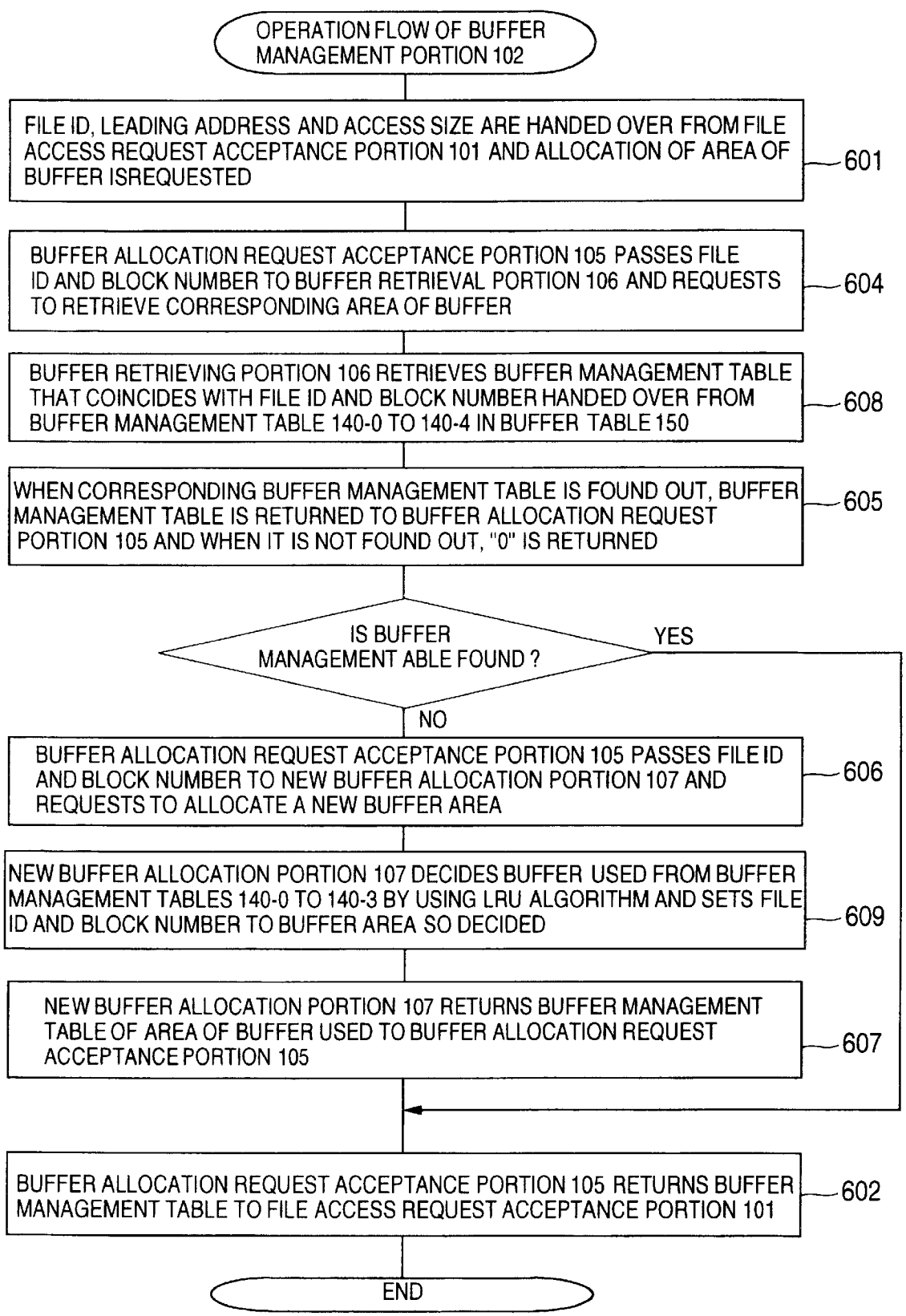
FIG. 10 is a flowchart useful for explaining the operation of the buffer management portion in the first embodiment.

The operation of the buffer management portion 102 shown in FIG. 6 will be explained with reference to the flowchart shown in FIG. 10.

At the initial step 601, the buffer allocation request acceptance portion 105 is requested to allocate the data storage area inside the buffer 120 to which the file ID, the leading address and access size are handed over from the file access request acceptance portion 101.

At the step 604, the buffer allocation request acceptance portion 105 passes the file ID and the block number to the buffer retrieval portion 106 and requires to retrieve the storage area inside the corresponding buffer. Here, the block number is determined from the leading address.

At the step 608, the buffer retrieval portion 106 retrieves the buffer management table coincident with the file ID and the block number passed thereto from among the buffer management tables 140-0 to 140-3 inside the buffer table 150.

When the coincident buffer management table is found out at the step 605, the buffer retrieval portion 106 returns the buffer management table so found out to the buffer allocation request acceptance portion 105. When it is not found out, the buffer retrieval portion sends back "0" to the buffer allocation request acceptance portion. The latter executes the processing to the step 602 when the buffer management table is found out, and to the step 606 when the buffer management table is not found out.

At the step 606, the buffer allocation request acceptance portion 105 passes the file ID and the block number to the new buffer allocation portion 107 and requests to newly allocate the buffer.

At the step 609, the new buffer allocation portion 107 decides the area of the buffer used by using an LRU (Least Recently Used) algorithm for the buffer management tables 140-0 to 140-3 and sets the file ID and the block number to the buffer area so decided.

At the step 607, the new buffer allocation portion 107 returns the buffer management table 140 corresponding to the buffer area to be used to the buffer allocation request acceptance portion 105.

At the step 602, the buffer allocation request acceptance portion 105 returns the buffer management table 140 to the file access request acceptance portion 101. When the buffer management table is not found, the buffer allocation request acceptance portion 105 reports that the buffer management table is not found.

As described above, this embodiment makes it possible to collectively transfer the header and the data existing at separate addresses on the main storage device 420 to the client 200 through the network 300. As a result, data copy can be avoided and performance can be improved in comparison with the conventional method which copies the data 500 inside the buffer 120 to the address space continuing the header 510 and arranges again the header and the buffer to the continuous addresses.

Incidentally, in the foregoing embodiment and in each of the following embodiments, the communication control portion 110, the network file system portion 100, the file system portion 130, etc., as the constituent elements of the main storage device 420 other than the buffer 120 are disposed inside the main storage device 420, but these constituent elements of the main storage device 420 other than the buffer 120 may be disposed as a control portion outside the main storage device and may be connected to the input/output bus 640. In such a case, this control portion may be used as a storage device other than the main storage device and the secondary memory device.

In the foregoing embodiment and in each of the following embodiments, when a control portion such as the communication control portion 110, the network file system portion 100, the file system portion 130, etc., as the constituent elements of the main storage device 420 other than the buffer 120 is constituted by a program, the program of this control portion is stored in advance in the main storage device. Instead, it is also possible to store the program of this control portion in a storage medium such as a CD-ROM, a DVD, etc., to load this storage medium into a recording medium reader 50 connected to the input/output bus 440 shown in FIG. 1 and to read and store the program into the main storage device. Further, the program of the control portion may be stored in the main storage device through the network 300.

Figure 11:
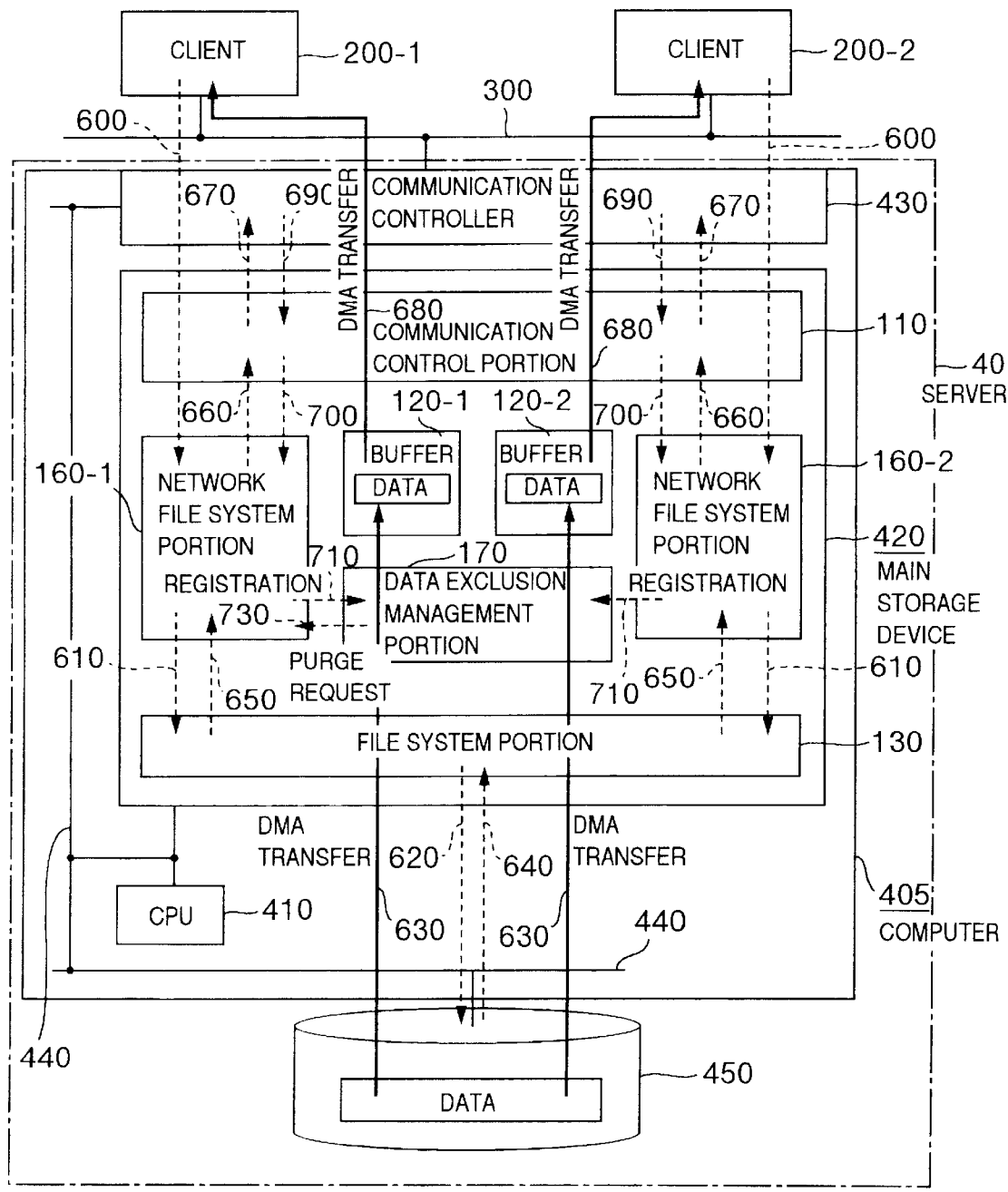
FIG. 11 is a block diagram showing a structure of a computer network system according to the second embodiment of the present invention.

Next, the second embodiment of the present invention will be explained with reference to FIG. 11. The characterizing feature of this embodiment resides in the construction in which a plurality of clients 200-1 and 200-2 (two clients, in the embodiment shown in FIG. 11 for simplification) are connected to the network 300, and in the main storage device 420, two network file system portions 160-1 and 160-2 and two buffers 120-1 and 120-2 are so disposed as to correspond to the clients 200-1 and 200-2, respectively, and a data exclusion management portion 170 is interposed in order to prevent the same data 500 from being stored between the buffers 120-1 and 120-2.

Since only one network file system portion 100 is provided to the server 400 in the first embodiment, the requests from a plurality of clients 200 cannot be accepted simultaneously when these clients are connected to the network. In this case, therefore, total file access performance of a plurality of clients 200 is the same as file access performance of the single client 200. In this embodiment, the network file system portions 160-1 and 160-2 and the buffers 120-1 and 120-2 are provided to the clients 200-1 and 200-2, respectively, so that even when the file access requests are generated simultaneously from a plurality of clients 200, they can be processed in parallel and total file access performance of a plurality of clients 200 is higher than file access performance of the single client 200.

Because the buffers 120-1 and 120-2 are so disposed separately as to correspond to the clients 200-1 and 200-2, retention of data consistency will become a problem when a plurality of clients gain access to the same file data, and this problem is solved by using the data exclusion management portion 170.

The overall operation of this embodiment will be explained with reference to the flowchart shown in FIG. 16.

Although the explanation will be given hereinafter about the case where the file access request is generated from one of the clients 200-1 and 200-2, for example, from the client 200-1, the explanation holds true as such when the file access request is generated from the other 200-2 of the clients.

First, at the step 600, the client 200-1 generates the file access request to the network file system portion 160-1 through the communication controller 430.

At the step 710, the network file system portion 160-1 analyzes the file access request, allocates the area inside the buffer 120-1 corresponding to the client 120-1 by using the buffer management table 140 and generates the registration request to the data exclusion management portion 170.

At the step 610, the network file system portion 160-1 generates the access request to the file system portion 130 so that the data can be stored in the area of the buffer 120-1 described above.

At the step 620, the file system portion 130 generates the access request to the secondary storage device 450.

At the step 640, the secondary storage device 450 generates the finish report to the file system portion 130 when the data 500 corresponding to the access request is transferred by the DMA transfer from the secondary storage device 450 to the area of the buffer 120-1 described above (630).

At the step 650, the file system portion 130 generates the finish report to the network file system portion 160-1.

At the step 660, the network file system portion 160-1 generates the communication request to the communication control portion 110 so that the data 500 stored in the buffer 120-1 is transferred to the client 200-1.

At the step 670, the communication control portion 110 generates the header 510 in response to the communication request, reports the address of the header 510 and its size and the address of the data inside the buffer 120-1 and its size to the communication controller 430, and generates the communication request.

At the step 680, the communication controller 430 transfers the header 510 and the data 500 inside the buffer 120 by the DMA transfer to the client 200-1 through the network 300.

Figure 16:
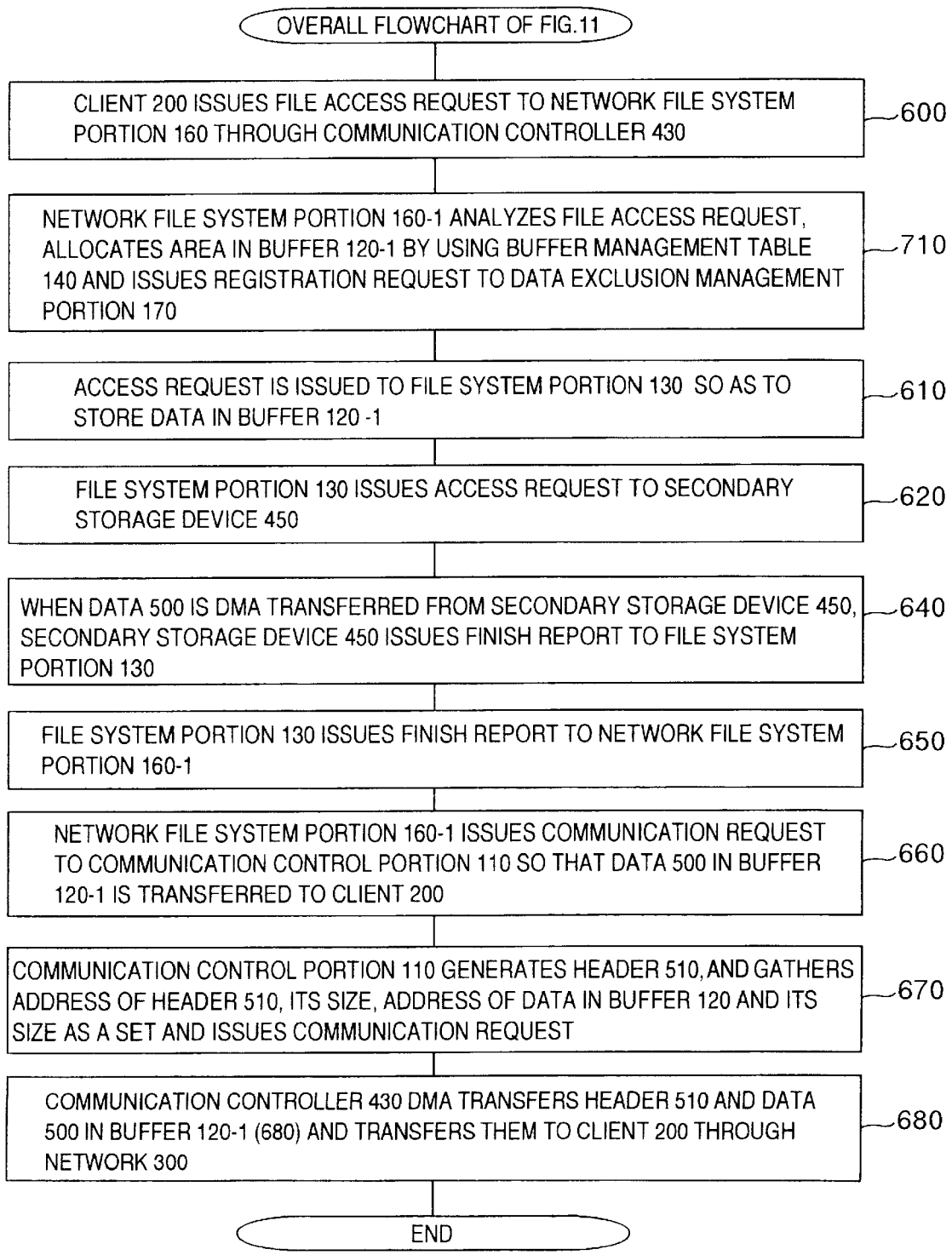
FIG. 16 is a flowchart useful for explaining the overall operation of the second embodiment.

The difference of the flowchart shown in FIG. 16 from the flowchart of the first embodiment resides in that the step 710 is added to the flowchart shown in FIG. 16. In other words, the operation of checking whether the buffer 120-2 for other client 200-2 has already saved the corresponding data is added to the flowchart of the first embodiment.

For example, the network file system portion 160-1 can check by using the data exclusion management portion 170 for the access to which file data the buffer 120-1, 120-2 for each client is used at present. To this end, the network file system portion 160-1 registers for the access to which file data the buffer 120-1 is used at the step 710, to the data exclusion management portion 170. When the buffer 120-2 for other client has already used the same file data as the data for the buffer 120-1 to be registered, the data exclusion management portion 170 generates to this other client 160-2 a purge request of the buffer 120-2 for other client at the step 730 and purges the data of the buffer 120-2 of this other client. This holds true also of the network file system portion 160-2.

Figure 12:
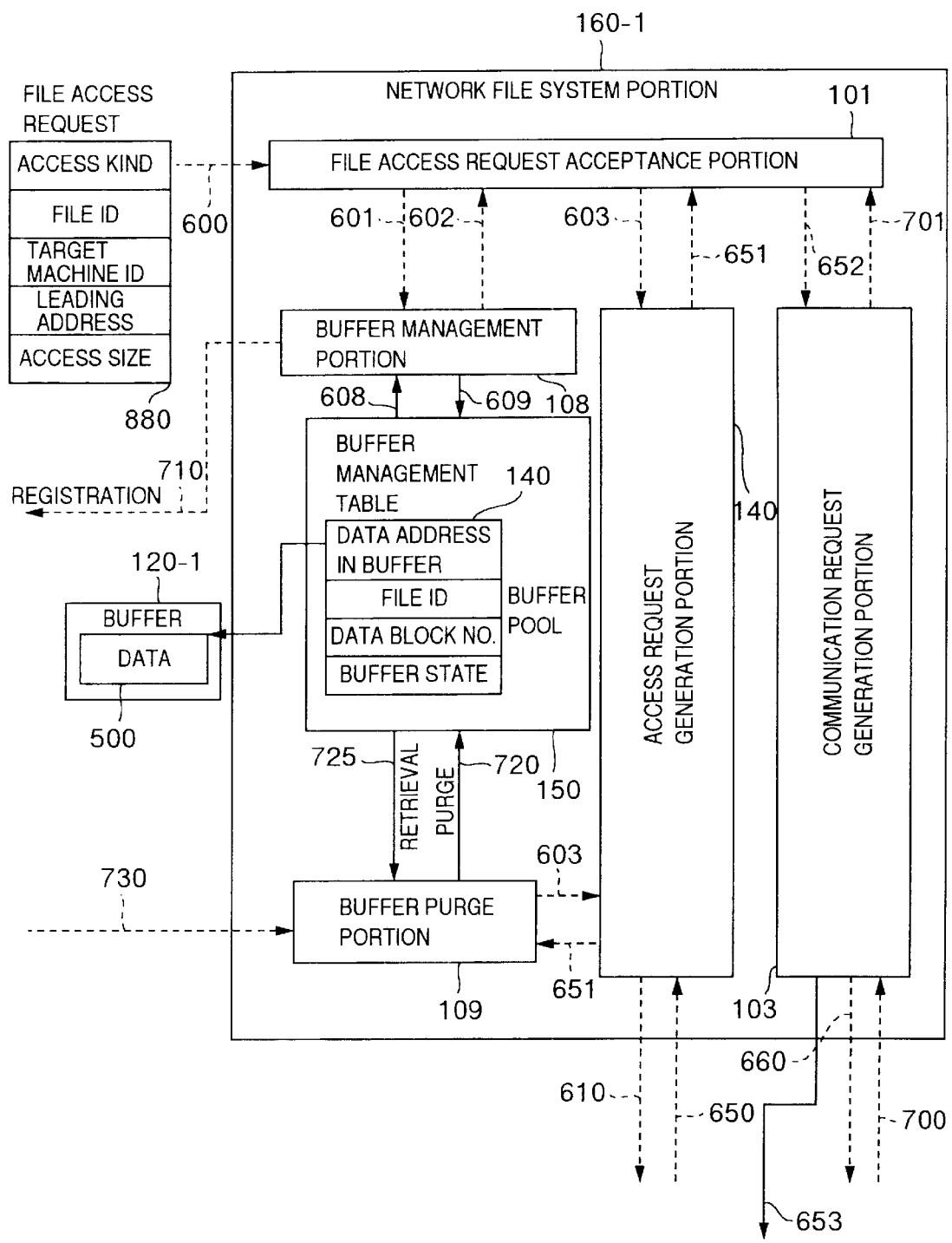
FIG. 12 is a block diagram showing a structural example of a network file system in the second embodiment.

FIG. 12 shows a structural example of the network file system portions 160-1 and 160-2 in this embodiment. Though the explanation will be given hereby on the structure of the network file system portion 160-1, it also holds true of the network file system portion 160-2.

In FIG. 12, the network file system portion 60-1 includes the file access request acceptance portion 101, the communication request generation portion 103, the access request generation portion 104, the buffer pool 150 and the buffer management table 140 in the same way as in the network file system portion 100 shown in FIG. 5. However, the network file system portion 160-1 uses the buffer management portion 108 for generating the registration request to the data exclusion management portion 170 in place of the buffer management portion 102 in the network file system portion 100 shown in FIG. 5 and uses additionally the buffer purge portion 109.

Figure 17:
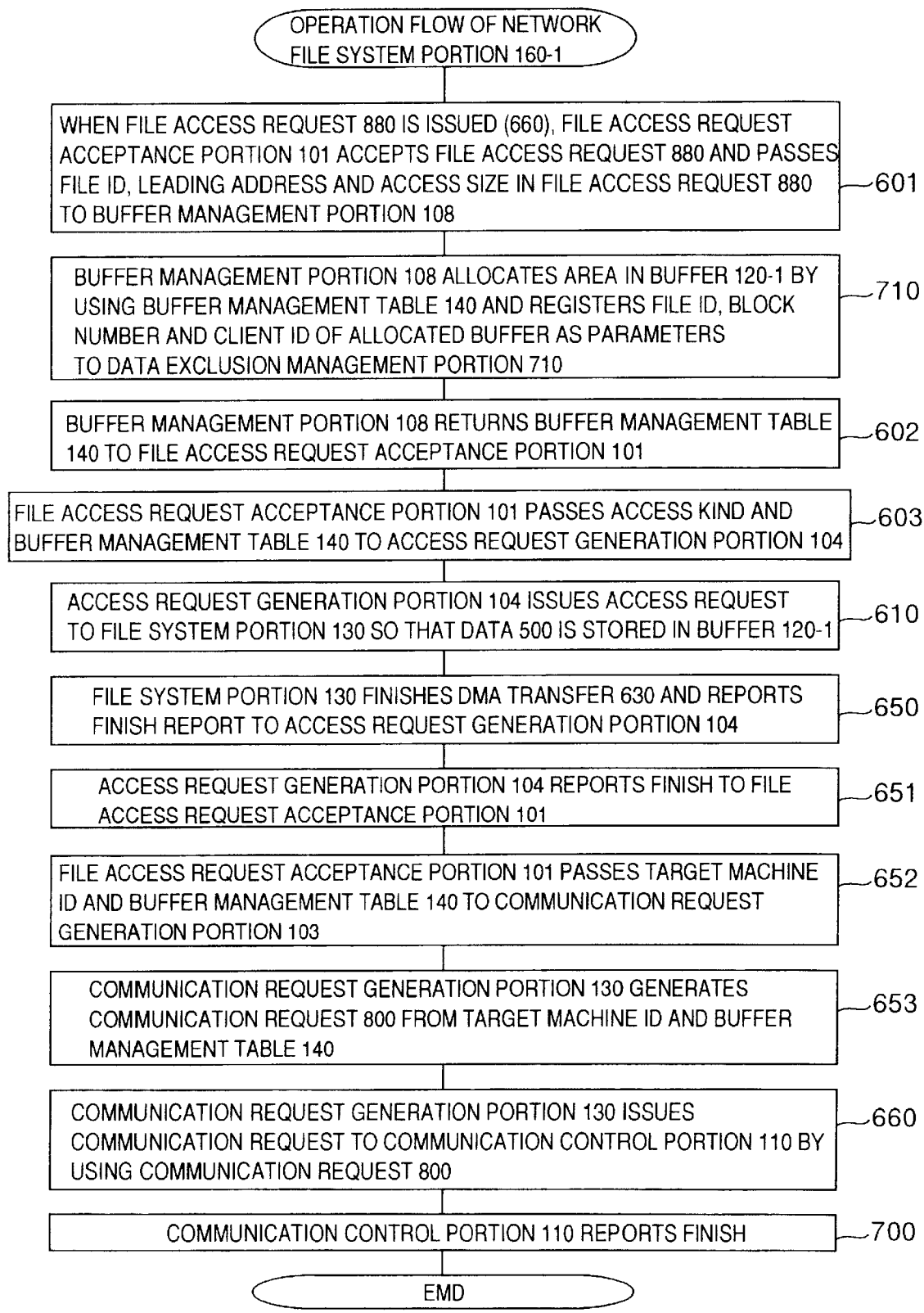
FIG. 17 is a flowchart useful for explaining the operation of the network file system portion in the second embodiment.
Figure 18:
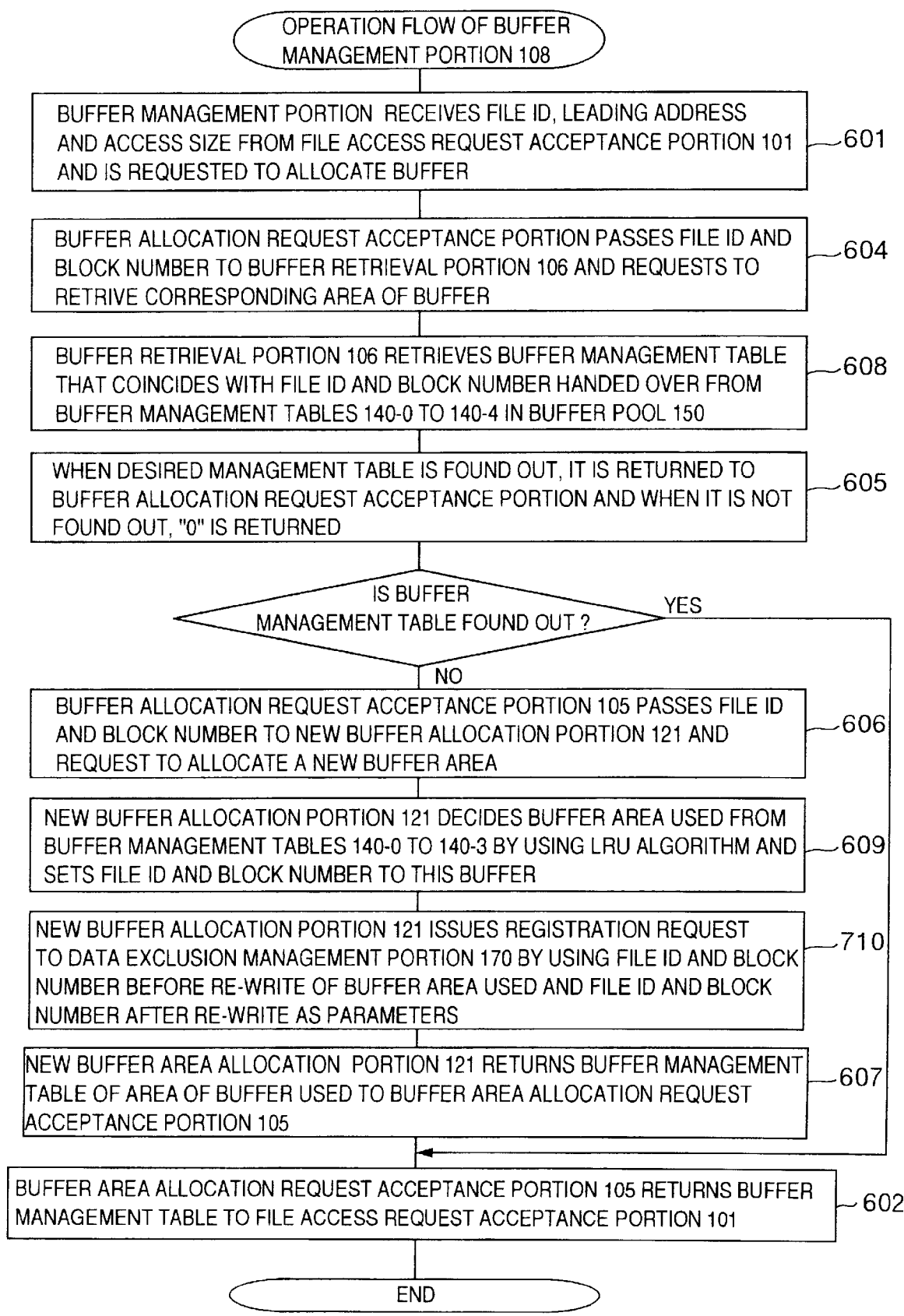
FIG. 18 is a flowchart useful for explaining the operation of the buffer management portion in the second embodiment.
Figure 19:
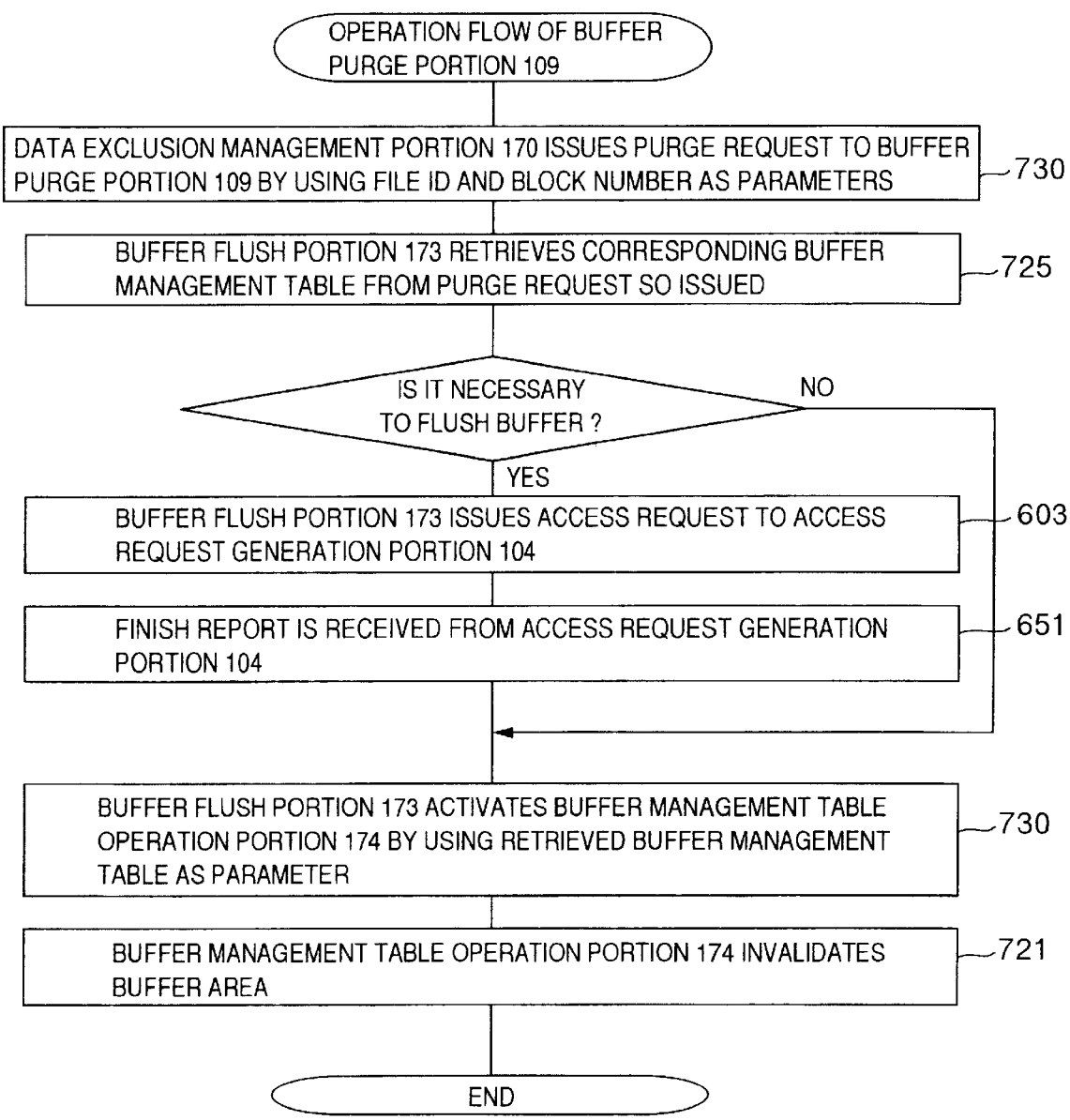
FIG. 19 is a flowchart useful for explaining the operation of the buffer purge portion in the second embodiment.
Figure 20:
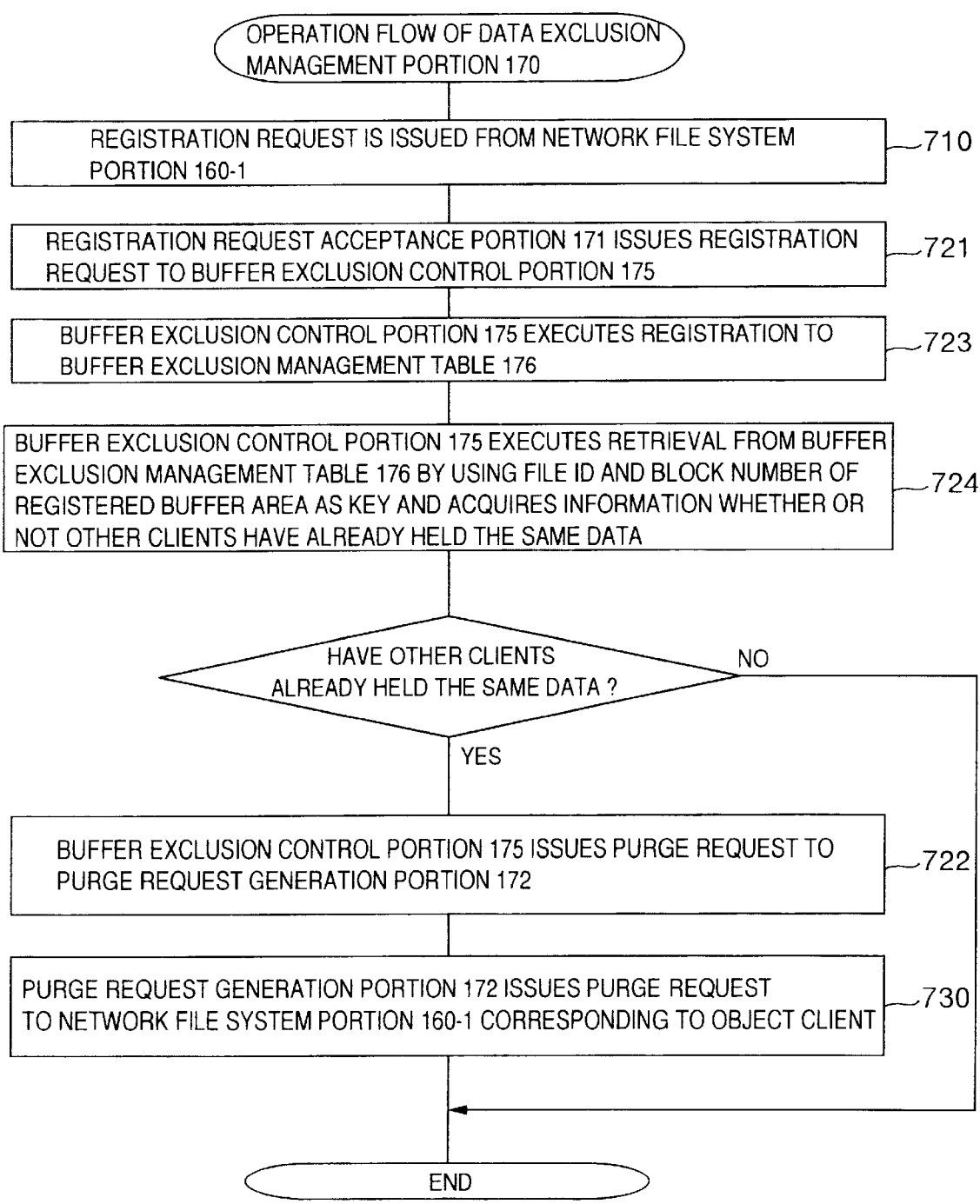
FIG. 20 is a flowchart useful for explaining the operation of the data exclusion management portion in the second embodiment.

The operation of the network file system portion 160-1 shown in FIG. 12 will be explained with reference to the flowchart shown in FIG. 17. Incidentally, the operation of the network file system portion 160-2 is the same.

First, at the step 601, when the file access request 880 is generated from the client 200-1 (660), the file access request acceptance portion 101 accepts the file access request 880 and hands over the file ID inside the file access request 880, the leading address and the access size to the buffer management portion 102.

At the step 710, the buffer management portion 102 allocates the area inside the buffer 120-1 corresponding to the client 200-1 by using the buffer management table 140 in response to the access request 880 and registers the file ID, the block number and the target machine ID of the allocated area inside the buffer as the parameters to the data exclusion management portion 710.

At the step 602, the buffer management portion 102 returns the buffer management table 140 to the file access request acceptance portion 101.

At the step 603, the file access request acceptance portion 101 hands over the access kind and the buffer management table 140 to the access request generation portion 104.

At the step 610, the access request generation portion 104 generates the access request to the file system portion 130 so that the data 500 is stored in the buffer 120-1.

At the step 650, the file system portion 130 finishes the DMA transfer 630 of the data 500 and reports the finish report to the access request generation portion 104.

At the step 651, the access request generation portion 104 reports the finish to the file access request acceptance portion 101.

At the step 652, the file access request portion 101 hands over the target machine ID and the buffer management table 140 to the communication request generation portion 103.

At the step 653, the communication request generation portion 130 generates the communication request 800 from the target machine ID and the buffer management table 140.

At the step 660, the communication request generation portion 130 generates the communication request to the communication control portion 110 by using the communication request 800.

At the step 700, the communication control portion 110 reports the finish.

Figure 13:
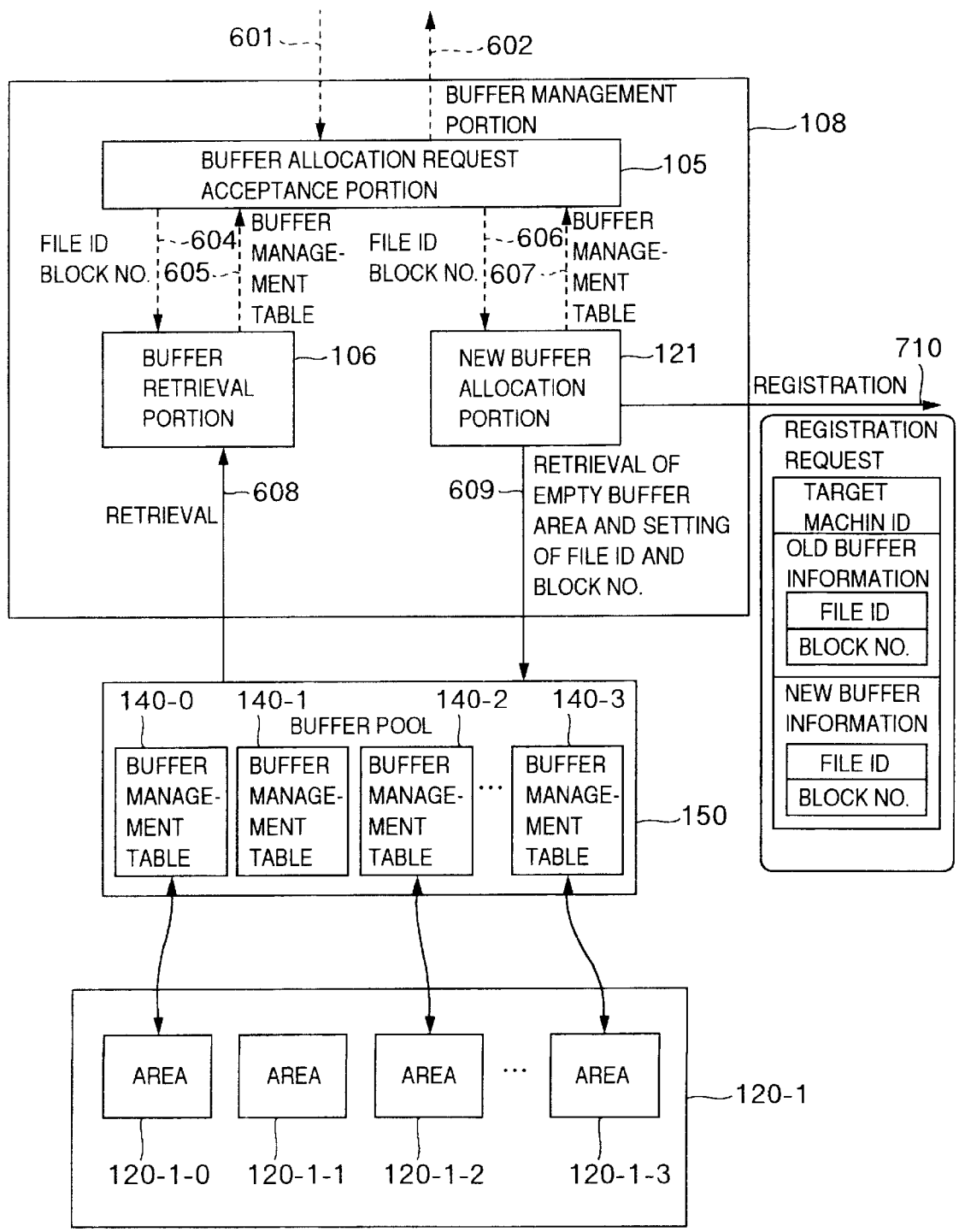
FIG. 13 is a block diagram showing a structural example of a buffer management portion in the second embodiment.

FIG. 13 shows in detail a structural example of the buffer management portion 108 used for each network file system portion 160-1, 160-2 shown in FIG. 12. In FIG. 13, the buffer management table 140 comprises a plurality of (four, in this embodiment) tables 140-0 to 140-3, which correspond to the data storage areas 120-1-0 to 120-1-3 inside the buffer 120-1, respectively. Incidentally, though FIG. 3 shows the structure of the buffer management portion 108 used in the network file system portion 160-1, the structure of the buffer management portion 108 used in the network file system portion 160-1 is also the same. In comparison with the buffer management portion 102 shown in FIG. 6, the buffer management portion 108 shown in FIG. 12 is different in that a new buffer allocation portion 121 for generating the registration request 710 to the data exclusion management portion 170 is used. To operation of the buffer management portion 108 will be explained with reference to the flowchart shown in FIG. 18.

First, at the step 601, the buffer management portion 108 receives the file ID, the leading address and the access size from the file access request acceptance portion 101 and is required to allocate the area of the buffer 120-1.

At the step 604, the buffer allocation request acceptance portion 105 hands over the file ID and the block number to the buffer retrieval portion 106 and requests retrieval of the corresponding buffer.

At the step 608, the buffer retrieval portion 106 retrieves the buffer management table corresponding to the file ID and the block number handed over thereto from the buffer management tables 140-0 to 140-3 inside the buffer table 150.

At the step 605, if the corresponding buffer management table is found out, the buffer management table so found out is returned and if not, "0" is returned, to the buffer allocation request acceptance portion 105. If the corresponding buffer management table is found out, the buffer allocation request acceptance portion 105 proceeds the processing to the step 602 and if not, to the step 606.

At the step 606, the buffer allocation request acceptance portion 105 hands over the file ID and the block number to the new buffer allocation portion 107 and request the allocation of a new buffer.

At the step 609, the new buffer allocation portion 107 decides the buffer to be used by using the LRU algorithm for the buffer management tables 140-0 to 140-3 and sets the file ID and the block number to the buffer so determined.

At the step 710, the new buffer allocation portion 107 generates the registration request to the data exclusion management portion 170 by using, as the parameters, the file ID and the block number before rewrite of the buffer used and the file ID and the block number after rewrite.

At the step 607, the new buffer allocation portion 107 returns the buffer management table 140 of the buffer used to the buffer allocation request portion 105.

At the step 602, the buffer allocation request acceptance portion 105 returns the buffer management table 140 which is found out, to the file access request acceptance portion 101. When the corresponding buffer management table is not found out, the report that this table is not found out is given to the file access request acceptance portion 101.

Figure 14:
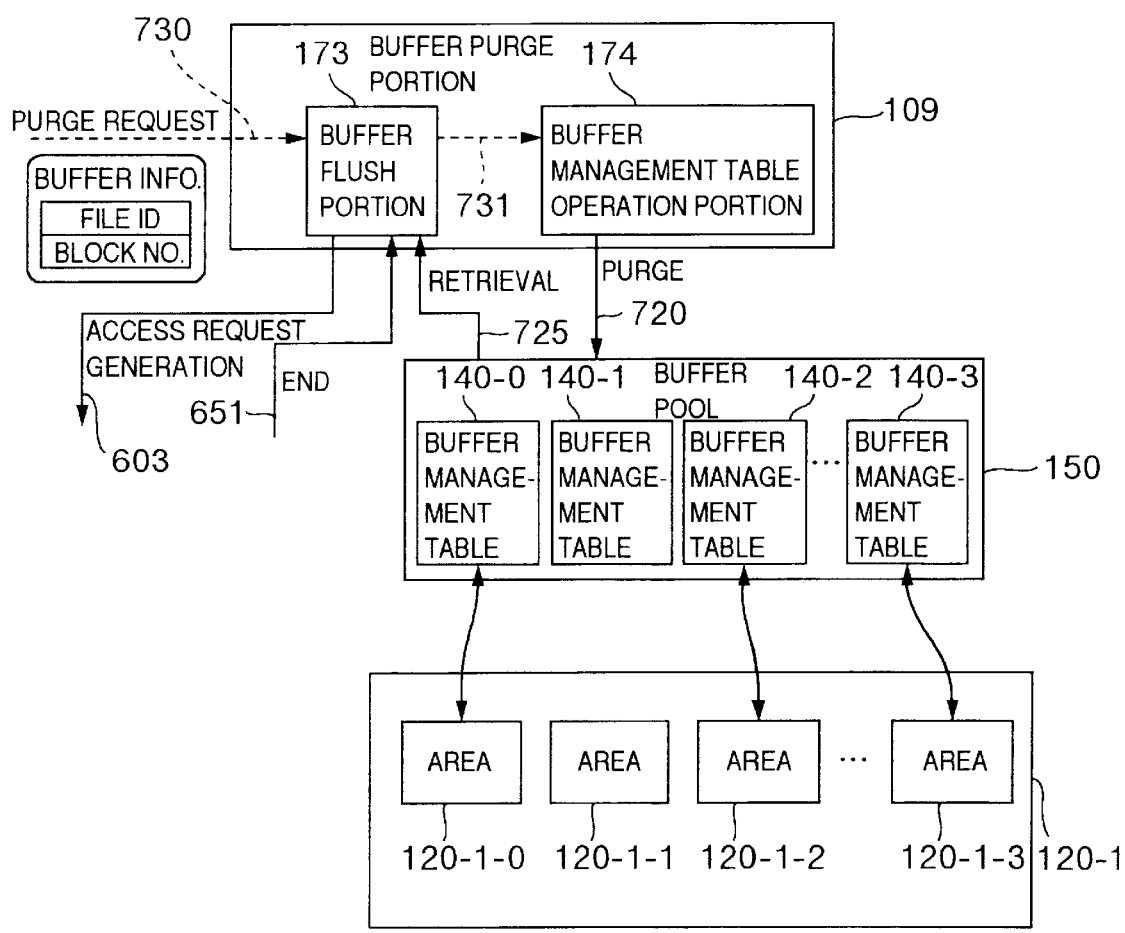
FIG. 14 is a block diagram showing a structural example of a buffer purge portion in the second embodiment.

FIG. 14 shows in detail a structural example of the buffer purge portion 109 inside each network file system portion 160-1, 160-2 shown in FIG. 12. Incidentally, though FIG. 14 shows the example of the buffer purge portion 109 inside the network file system portion 160-1, the buffer purge portion 109 inside the network file system portion 160-2 has the same structure, too. As shown in FIG. 14, the buffer purge portion 109 comprises a buffer flush portion 173 and a buffer management table operation portion 174.

The purge request sent from the data exclusion management portion 170 comprises the file ID and the block number. Next, the operation of the buffer purge portion 109 inside the network file system portion 160-1 will be explained with reference to the flowchart shown in FIG. 19. Incidentally, the operation of the buffer purge portion 109 inside the network file system portion 160-2 is the same, too.

First, at the step 730, the data exclusion management portion 170 generates the purge request to the buffer purge portion 109 by using the file ID and the block number as the parameters.

At the step 725, the buffer flush portion 173 retrieves the corresponding buffer management tables (140-0 to 140-3) in accordance with the purge request so generated. If it is necessary to flush the area of the corresponding buffer 120-1, the processing proceeds to the step 603 and if not, to the step 730.

At the step 603, the buffer flush portion 173 generates the access request to the access request generation portion 104.

At the step 651, the buffer flush portion 173 receives the finish report from the access request generation portion 104.

At the step 730, the buffer flush portion 173 operates the file management table operation portion 174 by using the buffer management table retrieved as the parameter.

At the step 721, the buffer management table operation portion 174 invalidates the area of the buffer corresponding to the retrieved buffer management table.

Figure 15:
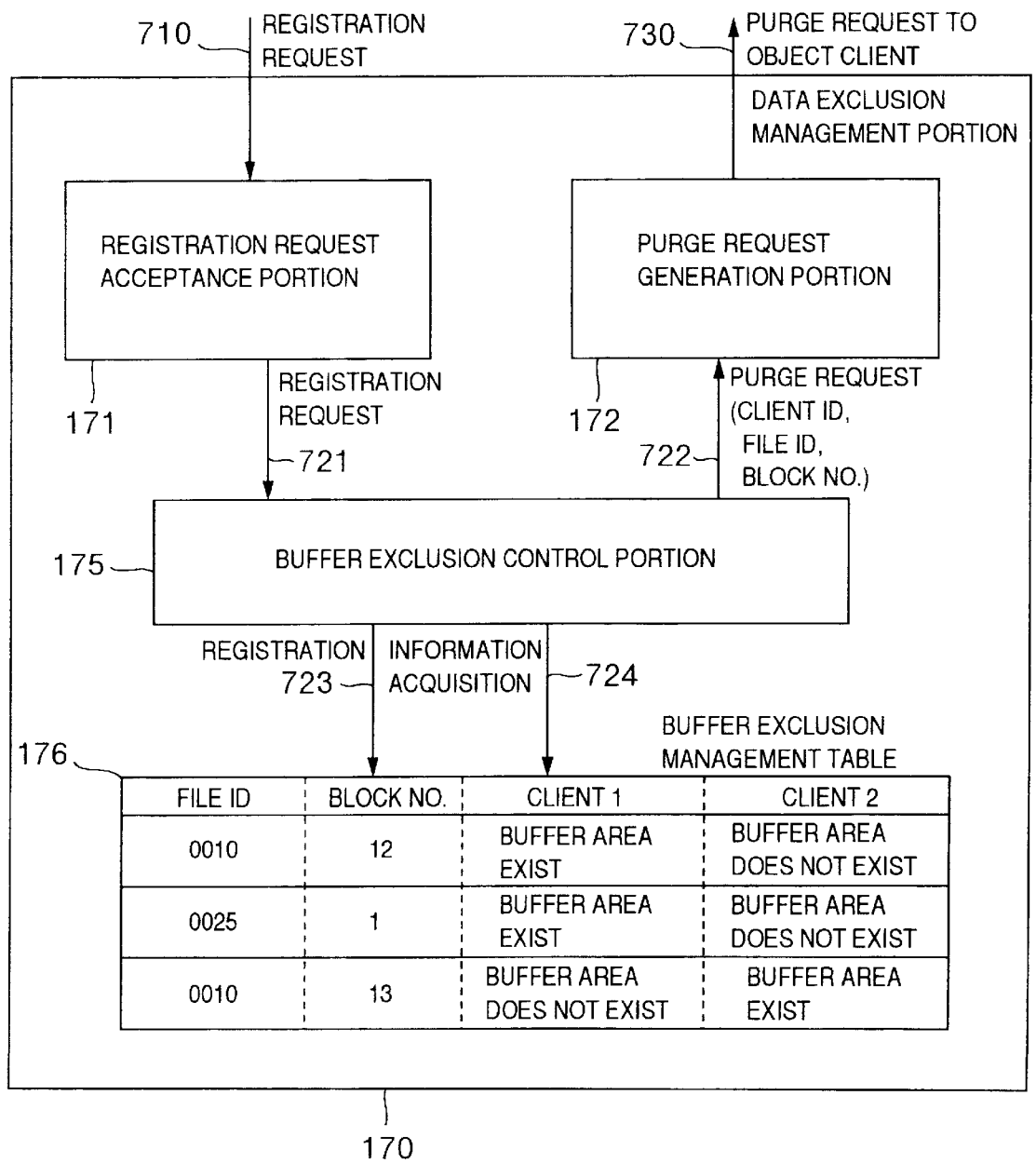
FIG. 15 is a block diagram showing a structural example of a data exclusion management portion in the second embodiment.

Next, FIG. 15 shows in detail an example of the data exclusion management portion 170 in this embodiment.

In FIG. 15, the data exclusion management portion 170 is shown composed of the registration request acceptance portion 171, the purge request generation portion 172, the buffer exclusion control portion 173 and the buffer exclusion management table 174 representing the status of the buffers 120-0 to 120-1 of the clients 200-1 to 200-2. The operation of the data exclusion management portion 170 will be explained with reference to the flowchart shown in FIG. 20.

First, at the step 710, the registration request is generated from the network file system portion 160 such as the network file system portion 160-1 corresponding to the client 200-1, for example.

At the step 721, the registration request acceptance portion 171 generates the registration request to the buffer exclusion control portion 175.

At the step 723, the buffer exclusion control portion 175 registers the client ID, the file ID and the block number for the area of the buffer (120-1) corresponding to the buffer exclusion management table 176 in response to this registration request.

At the step 724, the buffer exclusion control portion 175 executes retrieval from the buffer exclusion management table 176 by using the file ID and the block number of the registered buffer area as the key and acquires the information as to whether or not the other client (client 200-2 in this embodiment) has already held the same data. When the other client has already held the same data, the processing proceeds to the step 727 and the processing is finished when it is not held.

At the step 722, the buffer exclusion control portion 175 generates the purge request to the purge request generation portion 172.

At the step 730, the purge request generation portion 172 generates the purge request to the network file system portion 160-1 corresponding to the object client. When the same data exists inside the buffer 120-2 of the other client 200-2 in this manner, the data is purged.

As described above, this embodiment allows the network file system portion 160 and the buffer 120 to correspond to each client 200-1, 200-2. Therefore, even when the clients 200-1 and 200-2 generate simultaneously the file access requests, these requests can be processed in parallel and total performance can be improved. Because the data exclusion management portion 170 is disposed, data consistency can be maintained even when the clients 200-1 and 200-2 gain access to the same data.

Next, the third embodiment of the present invention will be explained with reference to FIG. 21.

Unlike the second embodiment, this embodiment does not dispose in advance the buffer and the network file system portion for each of a plurality of clients but secures the buffer area in accordance with the connection request from the client and disposes the network file system portion. To this end are disposed a network file system activation portion (file access request processing portion activation portion) 180 and a resource table 190 for managing the resources of the network file system portion. In other words, when the network file system activation portion 180 receives the connection request for the server sent from the client 200 through the communication controller 430, the activation portion 180 looks up the resource table 190, dynamically secures the memory area corresponding to the client on the buffer 120 and generates the network file system portion 120 corresponding to the client.

In this embodiment, the network file system portion 160 and the buffer 120 are dynamically allocated in accordance with the connection request from the client and for this reason, the resources the server 400 has can be used efficiently. Further, this embodiment can avoid the problem that when the number of clients becomes excessively great, file access performance of the server per client drops and a real time access becomes impossible to those data which requires the real time access such as video contents.

Figure 21:
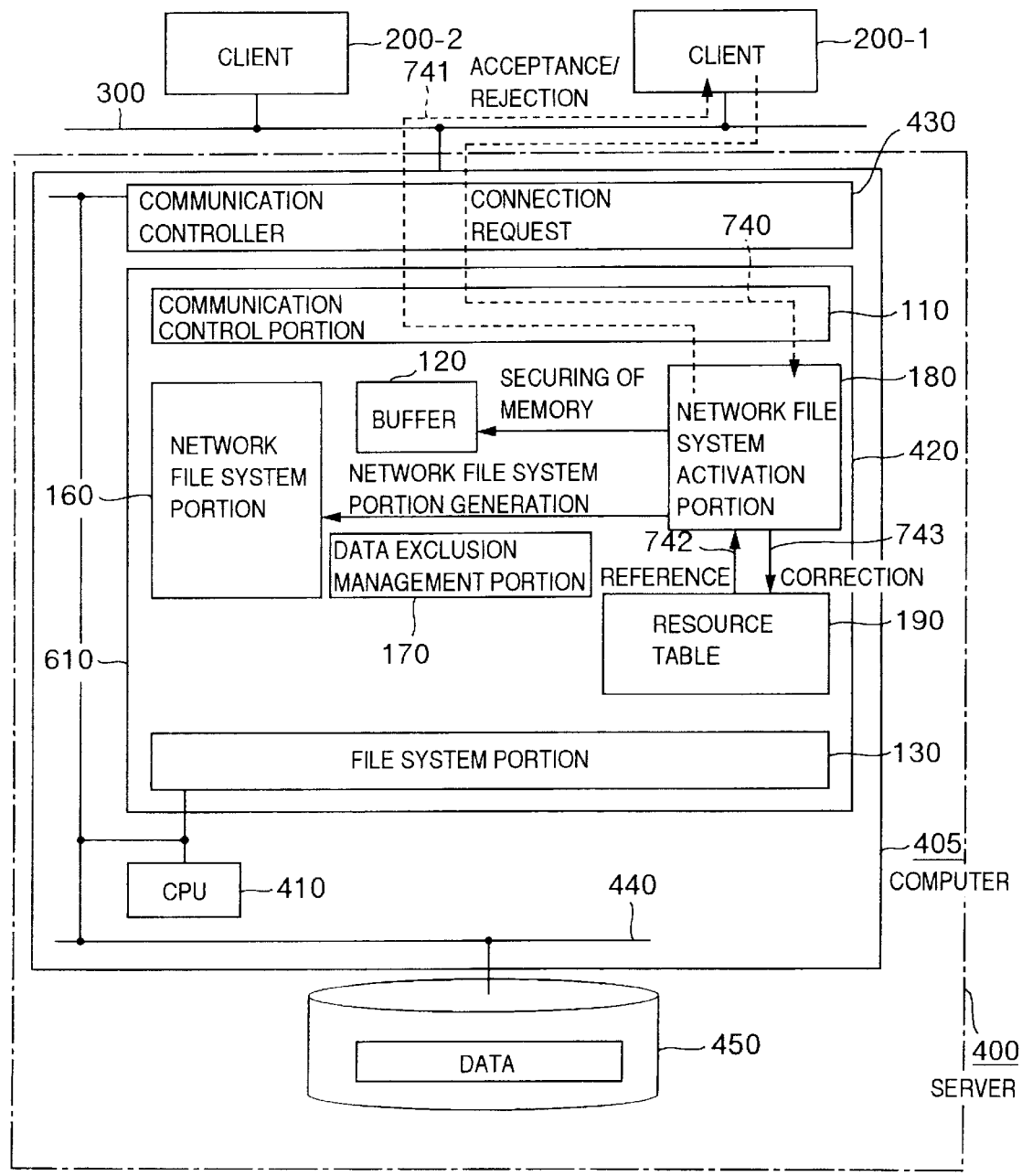
FIG. 21 is a block diagram showing a structure of a computer network system according to the third embodiment of the present invention.

Incidentally, a plurality of clients 200 are connected to the network in this embodiment but only two clients (200-1 and 200-2) are shown connected in FIG. 21 for ease of explanation.

FIG. 22 shows a structural example of the resource table 190 which is referred to, and changed by, the network file system activation portion 180. The resource table 190 shown in FIG. 22 comprises the maximum band representing the total transfer capacity of the server of transferring the data of up to which bands, the band used by the client 200 which is connected at present, the maximum number of connectable clients permitted by the server and the number of clients which are connected at present.

Figure 23:
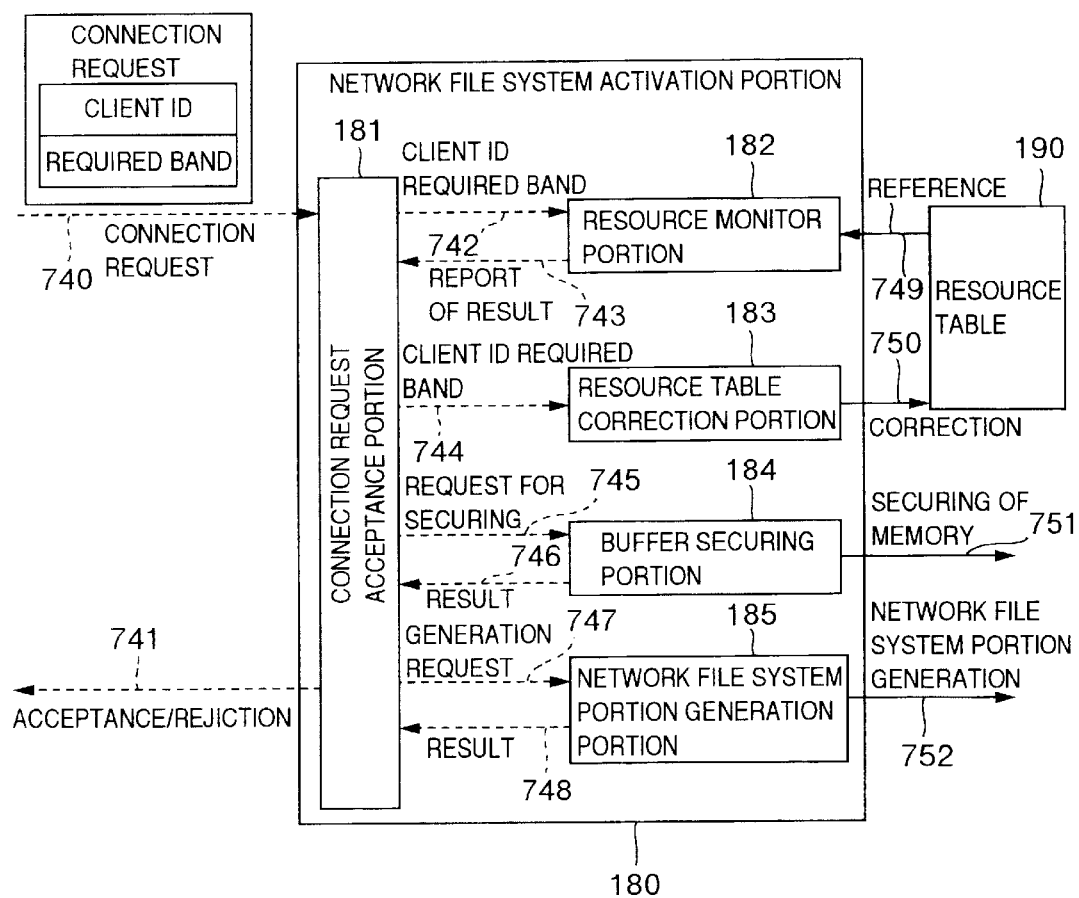
FIG. 23 is a block diagram showing a structural example of a network file system activation portion in the third embodiment.

As shown in FIG. 23, the network file system activation portion 180 comprises a connection request acceptance portion 181, a resource monitor portion 182, a resource table correction portion 183, a buffer securing portion 184 and a network file system portion generation portion 185, and the connection request from the client 200 comprises a client ID and a required band.

Figure 24:
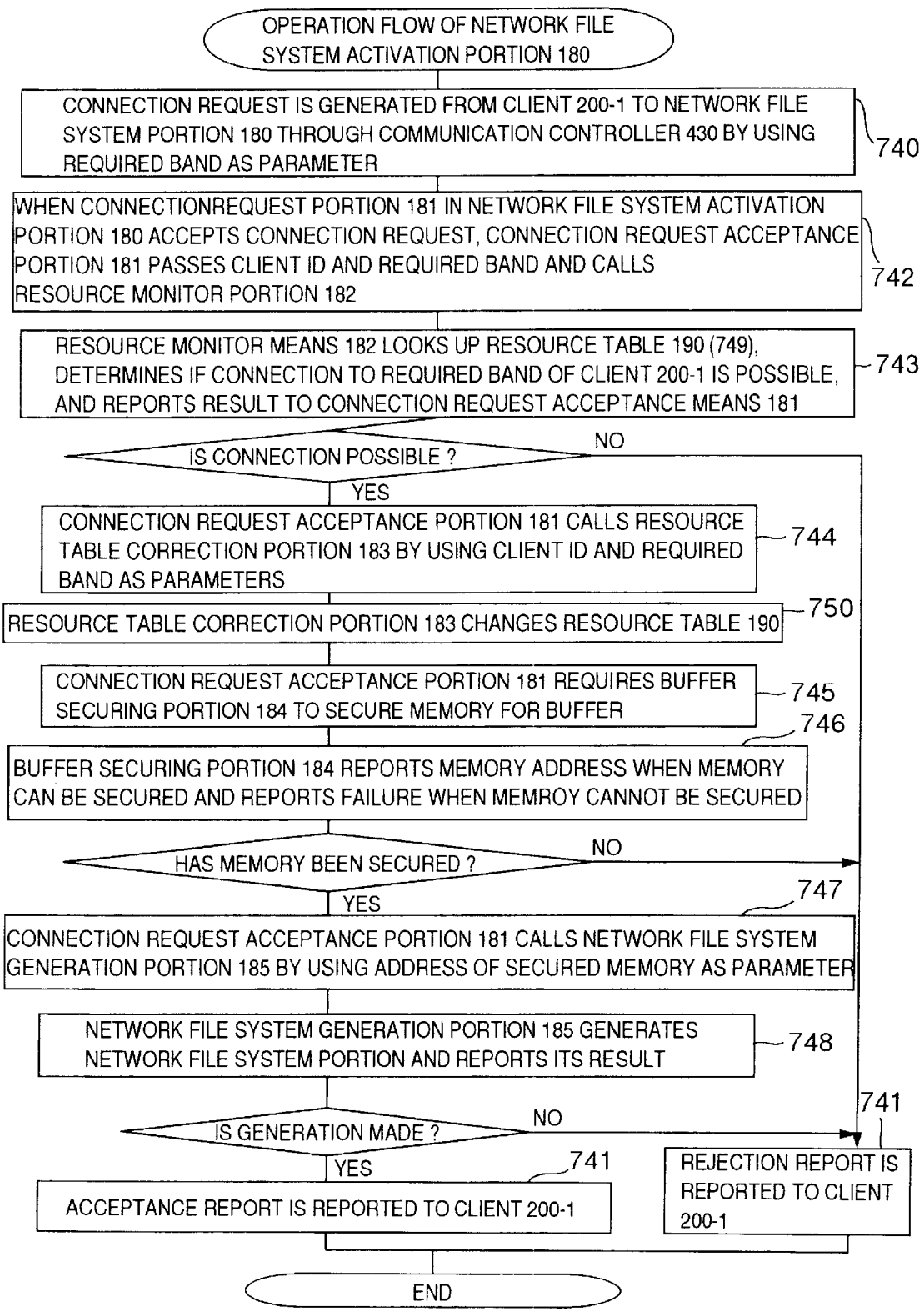
FIG. 24 is a flowchart useful for explaining the operation of the network file system activation portion in the third embodiment.

The operation of the network file system activation portion 180 of this embodiment will be explained with reference to the flowchart shown in FIG. 24.

First, at the step 740, the client 200 (for example, the client 200-1) generates the connection request to the network file system portion 180 by using the required band as the parameter through the communication controller 741.

At the step 742, the connection request acceptance portion 181 inside the network file system activation portion 180 accepts the connection request and calls the resource monitor portion 182 by handing over the client ID and the required band of the connection request to this resource monitor portion 182.

At the step 743, the resource monitor portion 182 looks up the resource table 190 (749), judges for the required band of the client 200-1 whether or not this client 200-1 can be connected to the server 400 and reports the judgement result to the connection request acceptance portion 181. When the judgement result proves unconnectable, the connection request acceptance portion 181 proceeds the processing to the step 741 and when it is connectable, the connection request acceptance portion 181 proceeds the processing to the step 744.

At the step 744, the connection request acceptance portion 181 calls the resource table correction portion 183 by using the client ID of the connection request and the required band as the parameters.

At the step 750, the resource table correction portion 183 changes the resource table 190 on the basis of the connection request described above.

At the step 745, the connection request acceptance portion 181 requires the buffer securing portion 184 to secure the memory area inside the buffer 120.

At the step 746, the buffer securing portion 184 reports to the connection request acceptance portion 181 that it has secured the memory area in accordance with the request when it has succeeded in doing so and that it has not secured the memory area when it has failed. Then, the connection request acceptance portion 181 proceeds the processing to the step 741 when the memory is not secured, and to the step 747 when the memory is secured.

At the step 747, the connection request acceptance portion 181 calls the network file system portion generation portion 185 by using the address of the secured memory as the parameter.

At the step 748, the network file system portion generation portion 185 generates the network file system portion 160 and reports the result to the connection request acceptance portion 181.

At the step 741, when all the processings up to the step 748 prove successful, the acceptance report of the connection request is reported to the client 200-1. On the other hand, when the connection request is judged as unconnectable at the step 743 or when the memory cannot be secured at the stp 746 or when the network file system portion cannot be generated as the step 748, the rejection report of the connection request is given to the client 200-1.

According to the embodiment described above, the network file system portion 160 and the buffer 120 are generated and secured at the point when the connection request is generated from the client 200. For this reason, the resources of the server can be utilized efficiently. When the client gains access to the data for which the real time access is necessary such as the video contents, whether or not the connection can be made is judged on the basis of the required band from the client 200. In consequence, the problem that a greater number of clients than necessary are connected and the real time access cannot be made to the video contents, etc., can be prevented.

Figure 25:
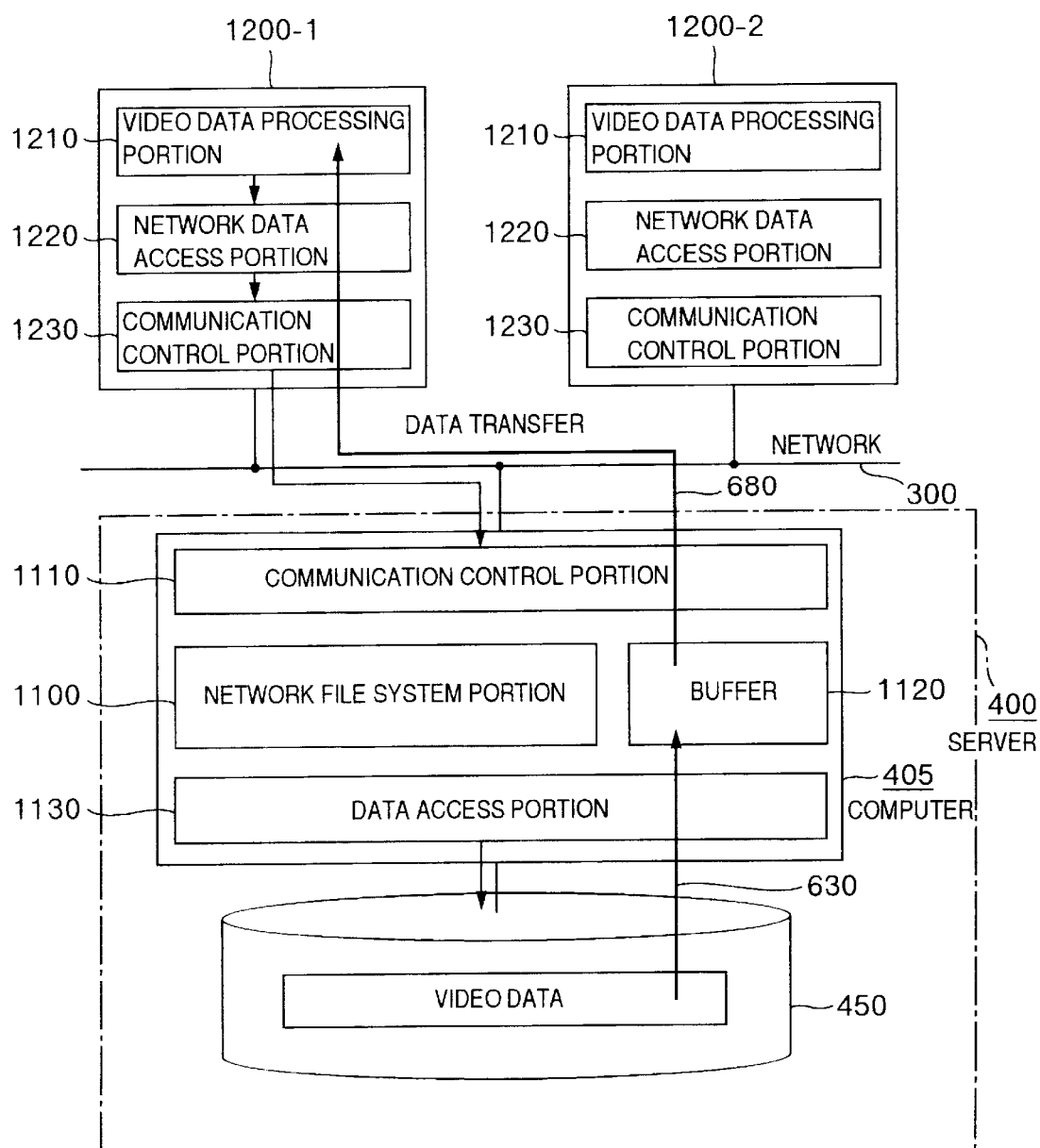
FIG. 25 is a block diagram showing a structure of a computer network system according to the fourth embodiment of the present invention.

FIG. 25 shows the fourth embodiment of the present invention. The fourth embodiment represents the case where a plurality of clients 1200 (the number of clients is two in this embodiment for ease of the explanation) and the server 400 are mutually connected through the network 300. The fourth embodiment enables the client equipped with a video data processing program for displaying and editing the images to gain access to the server storing the video data through a standard file access interface and in this instance, enables also the server to accomplish sufficient performance to transfer high quality image data to the clients.

To accomplish these objects, the server 400 is provided with at least one secondary storage device (magnetic disk, etc) storing the video data 510 and a computer 405. The computer 405 comprises a data access portion 1130 for controlling the secondary storage device and reading and writing the video data 510, a network file system portion 1100 for accepting a file access request from other computers (clients) connected to the network 300 and transferring this request to the data access portion 1130, a communication control portion 1110 for controlling the network 300 and a buffer 1120 for transferring the video data between the secondary storage device 450 and the network 300. These constituent elements 1100, 1110 and 1130 may be constituted by a program module stored in the main storage device inside the computer 405 or by hardwares.

Each client 1200-1, 1200-2 comprises a video data processing portion 1210 for displaying and editing the video data by using the standard file access interface, an interface conversion portion 1212 for converting the access request from the video data processing portion 1210 to an interface of the later-appearing network data access portion 1220, the network data access portion 1220 for gaining access to the video data 510 stored in the secondary storage device 450 of the server 400 through the network 300 and a communication control portion 1230.

Though the construction of this embodiment uses one server 400, two clients 120 and one network, they may be at least one, and their number is not particularly limited.

Figure 26:
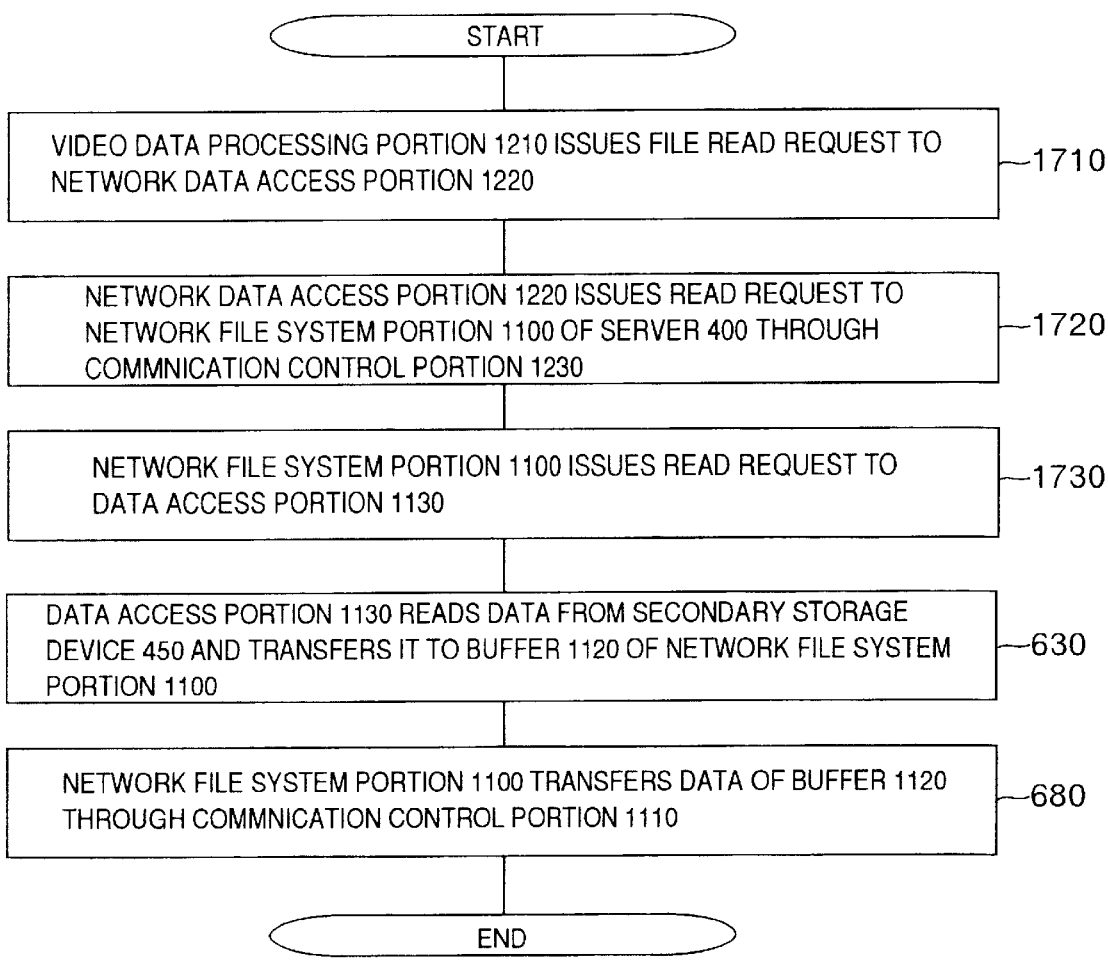
FIG. 26 is a flowchart useful for explaining the overall operation of the fourth embodiment.

The overall operation of this embodiment will be explained with reference to the flowchart shown in FIG. 26. Although the following explanation will be given on the case where the file read request is generated from the client 1200-1 among the clients 1200-1 and 1200-2, the explanation holds true as such about the case where the file read request is generated from the client 1200-2.

First, at the step 1710, the video data processing portion 1210 of the client 1200-1 generates the file read request to the network data access portion 1220.

At the step 1720, the network data access portion 1220 generates the read request to the network file system portion 1100 of the server 400 through the communication control portion 1230 and through the network 300.

At the step 1730, the network file system portion 1100 generates the read request to the data access portion 1130.

At the step 630, the data access portion 1130 reads the video data 510 from the secondary storage device 450 and transfers it to the read buffer 1120 in response to the read request.

At the step 680, the network file system portion 1100 transfers the data 510 inside the buffer 1120 to the client 1200-1 through the communication control portion 1110 and through the network 300.

Next, the network file system portion 1100, the data access portion 1130 and the communication control portion 1110 shown in FIGS. 25 and 26 will be explained in detail.

Figure 27:
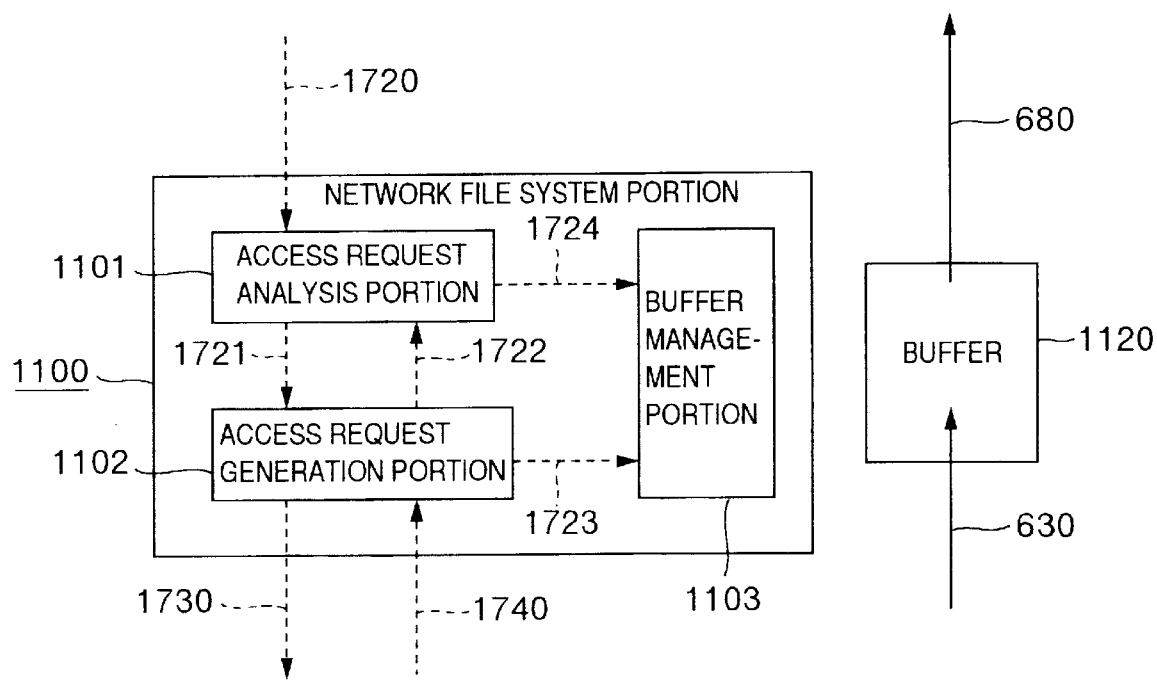
FIG. 27 is a block diagram showing a structural example of the network file system portion in the fourth embodiment.

FIG. 27 shows a structural example of the network file system portion 1100. As shown in FIG. 27, the network file system portion 1100 comprises an access request analysis portion 1101 for analyzing the access request sent from the network data access portion 1220 of the client 1200-1 through the communication control portion 1110 and reporting the analysis result to the access request generation portion 1102, an access request generation portion 1102 for generating the access request reported thereto as a disk access request to the data access portion 1130 and a buffer management portion 1103 for managing the buffers.

When the access request is generated from the network data access portion 1220, the access request analysis portion 1101 analyzes the request, and when the buffer 1120 is necessary, it makes an enquiry to the buffer management portion 1103 and acquires the necessary area of the buffer 1120. When the video data have already been stored in the area of the buffer 1120 so acquired, the content of this buffer area is transferred to the network data access portion 1220 of the client 1200-1 through the communication control portion 1230. When the video data are not stored in the acquired buffer area, the access request analysis portion reports this empty area to the access request generation portion 1102 in order to store the video data into this area. Receiving this report, the access request generation portion 1102 generates the disk access request to the data access portion 1130. The data access portion 1130 gains access to the secondary storage device 450, reads the data corresponding to the disk access request from the secondary storage device 450 and transfers the data to the area of the buffer 1120 described above.

In this instance, when the access request analysis portion 1101 judges that performance of the server 400 cannot be exploited if the access request from the client is as such used, it changes the size of the access request.

To make the judgement described above, the following step 1) to step 3) may be employed. Next, these steps 1) to 3) will be explained.

At the step 1), data access performance characteristics are determined by using the access size of the secondary storage device 450 of the server as the parameter. To determine the performance characteristics, it is possible to use either an actual measurement result or simulation.

When the secondary storage device 450 is a magnetic disk device, performance becomes generally higher as the access size is greater as the physical characteristics of the magnetic disk device. This characteristic is expressed by the formula [data access performance—F (access size)].

At the step 2), data transfer performance required for the server when N clients are connected to the server and the video data handled have an information quantity in the order of MB (megabyte) per T (second) or so is determined. To determine this performance, the formula, i.e. server data transfer performance—T×N, may be used.

At the step 3), an access size which satisfies the relation F (access size)>server data transfer performance, is determined.

When the access request from the client is smaller than the access size determined by the steps 1) to 3), the access size is changed to the access size determined by the steps 1) to 3).

Figure 32:
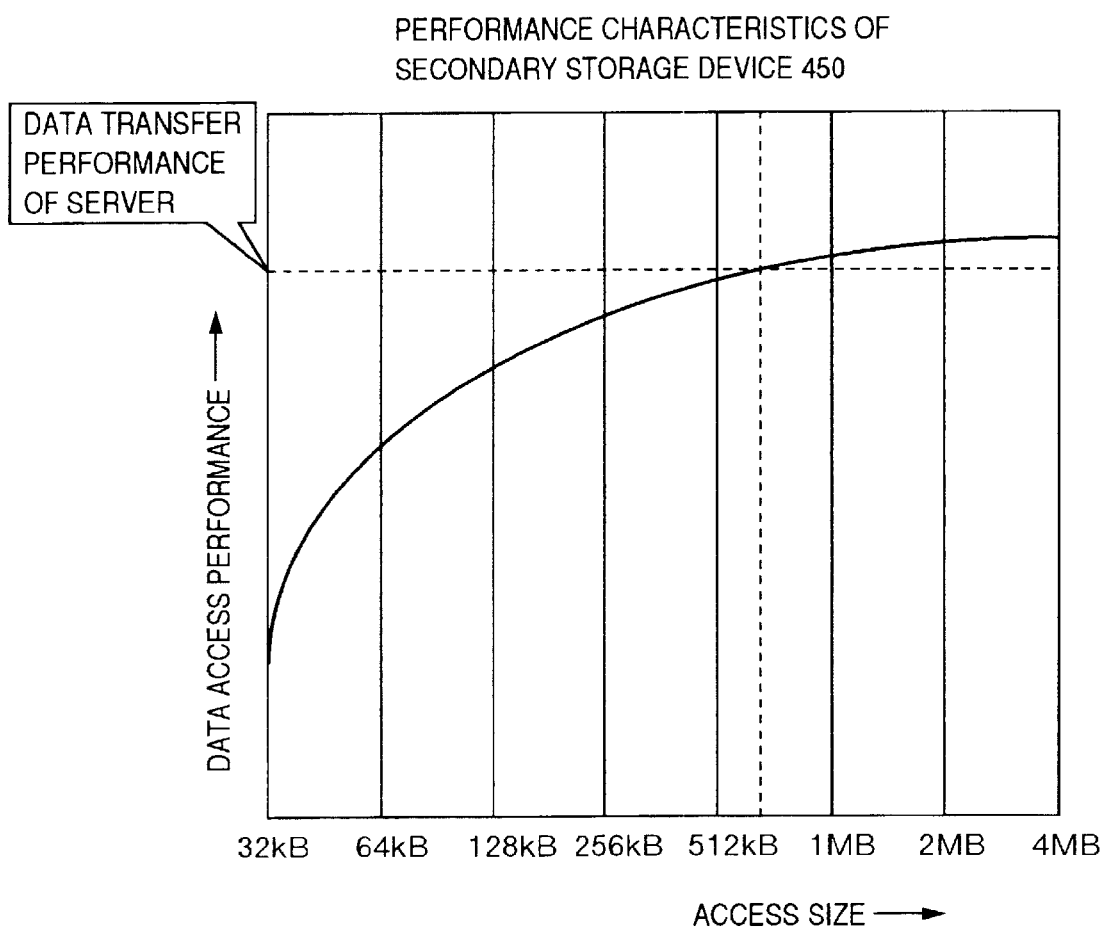
FIG. 32 shows performance characteristics of a secondary storage device in the fourth embodiment.

When the video data of 20 Mbps are connected to eight clients in the case of the magnetic disk apparatus 450 having the performance characteristics shown in FIG. 32, for example, all the access request sizes from the clients are changed to 1 MB when they are smaller than 1 MB.

Figure 28:
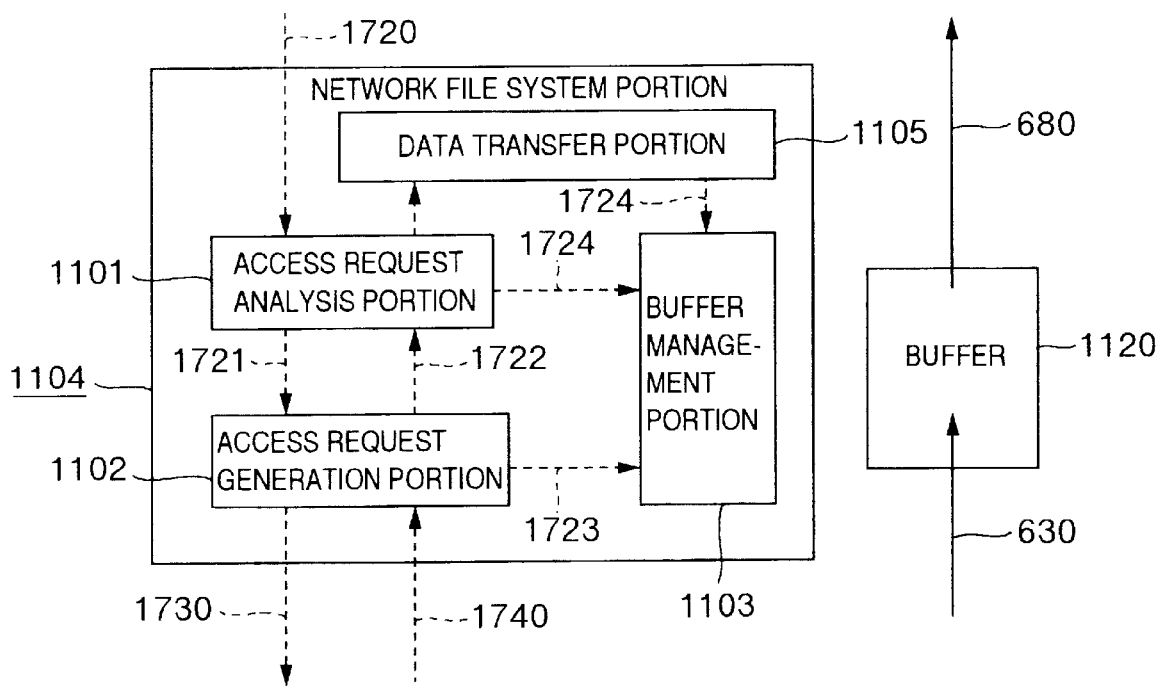
FIG. 28 is a block diagram showing a structural example of the network file system portion in the fourth embodiment.

The network file system portion 1100 shown in FIG. 27 may be constituted to a network file system portion 1104 shown in FIG. 28. FIG. 28 shows the structure wherein a data transfer portion 1105 is added to the structure shown in FIG. 27. In this structure, the data transfer to the clients is carried out by the data transfer portion 1105. Since the data transfer portion 1105 executes the data transfer in place of the access request analysis portion 1101, acceptance of the access request from the client 1200-1 and the data transfer can be executed in parallel. Therefore, performance when a plurality of clients 1200 gain access to the server 400 can be improved.

Figure 29:
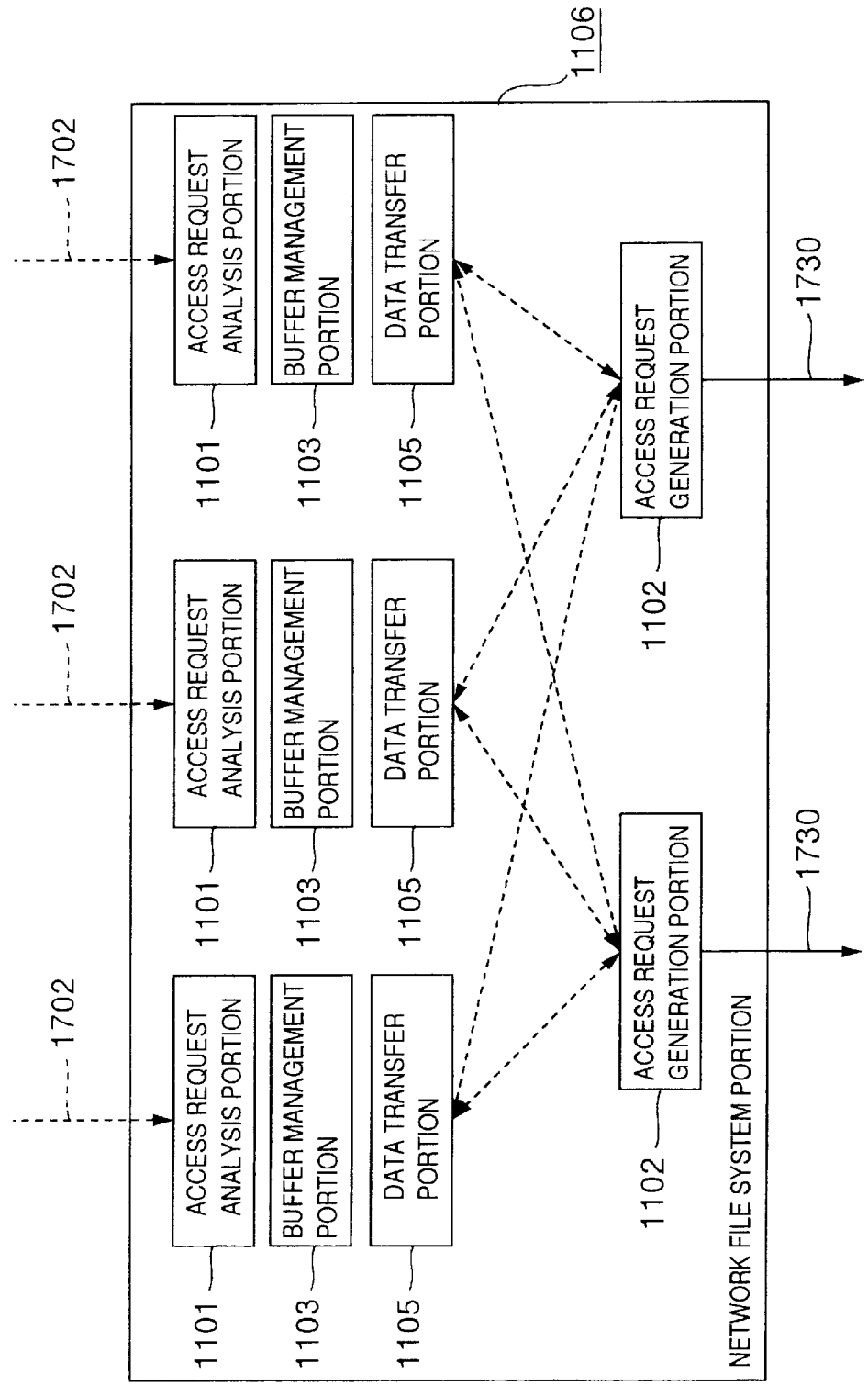
FIG. 29 is a block diagram showing a structural example of the network file system portion in the fourth embodiment.

Further, the network file system portion 1100 shown in FIG. 27 may be constituted to a network file system portion 1106 shown in FIG. 29. In the structure shown in FIG. 29, the access request analysis portion 1101, the buffer management portion 1103 and the data transfer portion 1105 are disposed for each client 1200 (FIG. 29 shows the case where the number of clients is three), and the access request generation portion 1102 is disposed for each secondary storage device 450 (FIG. 29 shows the case where the number of the secondary storage device is three). Because the access request analysis portion 1101, the buffer management portion 1103 and the data transfer portion 1105 are disposed for each client, the data access can be made in parallel for each client 1200. Because the access request generation portion 1102 is disposed for each secondary memory device 450, the practical access request can be made independently for each secondary storage device 450.

The buffer management portion 1103 may use any of the Least Recently Used algorithm, the First-In-First-Out algorithm and the Last-In-First-Out algorithm.

Figure 30:
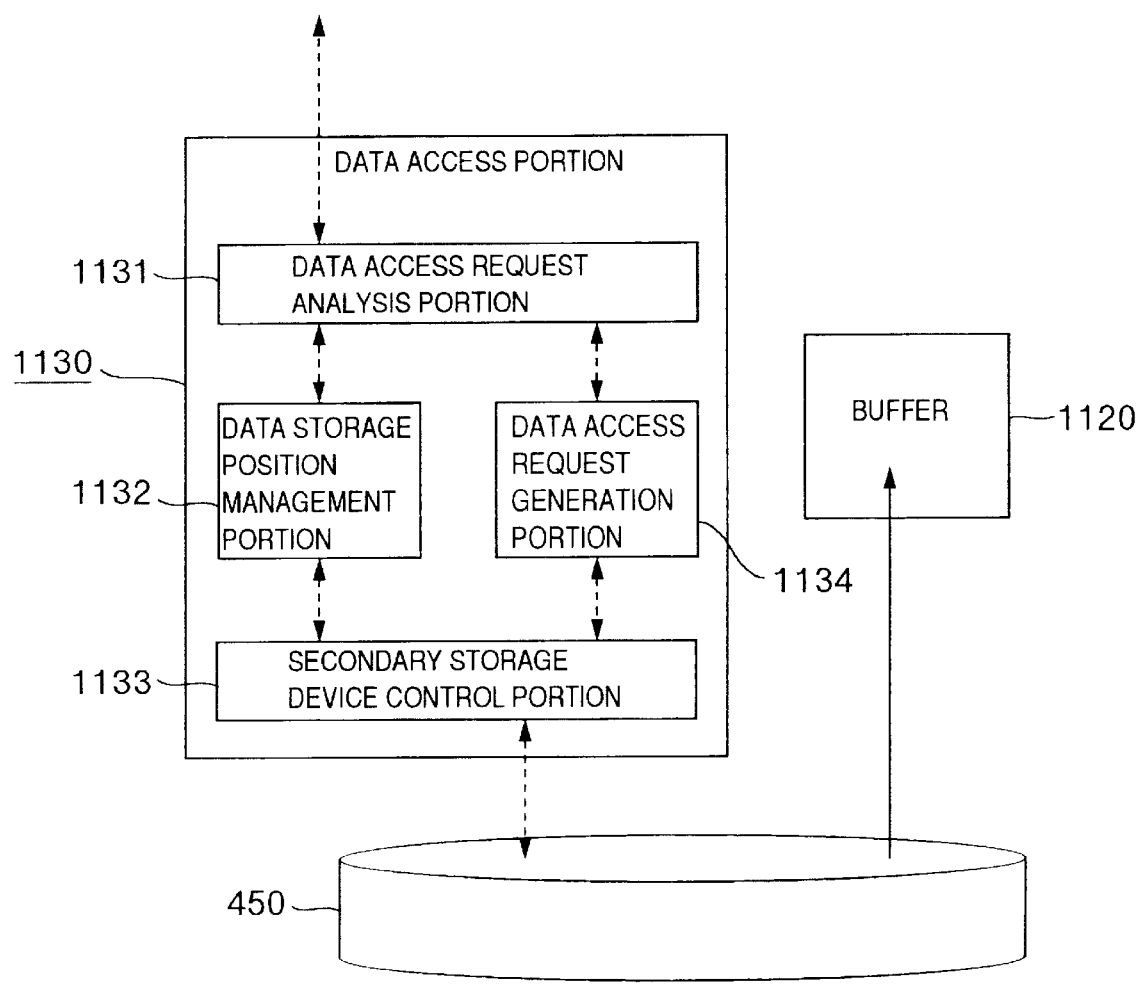
FIG. 30 is a block diagram showing a structural example of a data access portion in the fourth embodiment.

Next, FIG. 30 shows an example of the structure of the data access portion 1130. As shown in FIG. 30, the data access portion 1130 comprises a data access request analysis portion 1131 for analyzing the access request from the network file system portion 1100, a data storage position management portion 1132 for managing at which position inside the secondary storage device 450 the video data 510 are stored, a data access request generation portion 1134 for generating the data access request to the secondary storage device 450, and a secondary storage device control portion 1133 for controlling the secondary storage device 450.

The data access request analysis portion 1131 accepts and analyzes the access request generated from the network file system portion 1100, activates the data storage position management portion 1132, whenever necessary, to acquire the data storage position information and activates the data access request generation portion 1134. The data access request generation portion 1134 gains access to the video data 510 inside the secondary storage device 450 through the secondary storage device control portion 1133 and transfers this data to the buffer 1120.

In this manner, the video data 510 inside the secondary storage device 450 can be directly transferred by the data access portion 1130 to the buffer 1120.

Figure 31:
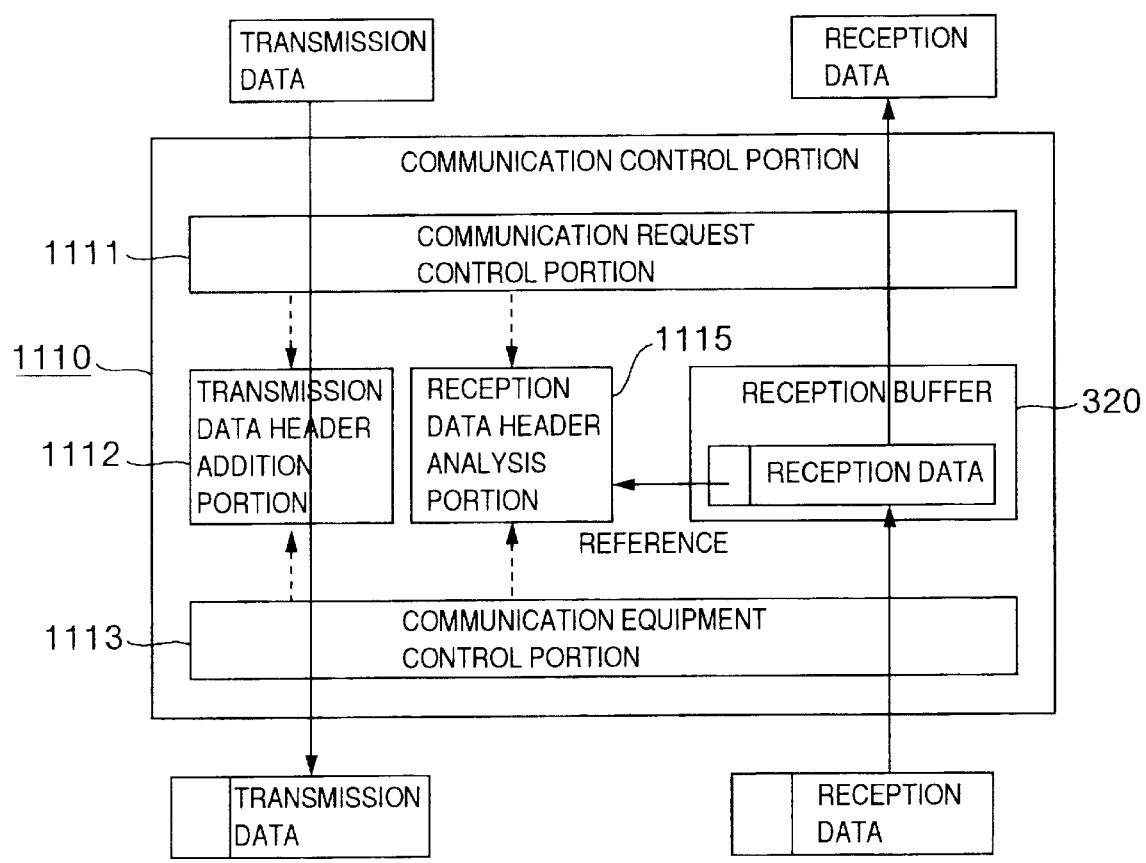
FIG. 31 is a block diagram showing a structural example of a communication control portion in the fourth embodiment.

Next, FIG. 31 shows an example of the structure of the communication control portion 1110. As shown in FIG. 31, the communication control portion 1110 comprises a communication request control portion 1111 for controlling the communication request from the network data access portion 1220 or from the network file system portion 1100, a transmission data header addition portion 1112 for adding a necessary header 1341 to the transmission data 1340, a reception buffer 1320, a reception data header analysis portion 1114 for extracting and analyzing the header 1351 from the reception data 1350 stored in the reception buffer 1320 and a communication equipment control portion 1113 for controlling communication equipment.

When the transmission request is generated to the communication request control portion 1111 in such a structure, the communication request control portion 1111 activates the transmission data header addition portion 1114, adds the header 1341 and transmits the data to the network 300 through the communication equipment control portion 1113.

When the reception request is generated to the communication request control portion 1111, the transmission request control portion 1113 receives the data from the network 300, stores the data in the reception buffer 320 and then activates the reception data header analysis portion 1115. The reception data header analysis portion 1115 analyzes the header 1351, cuts off the header 1351 from the data 1350 and generates the reception report to the communication request control portion 1111 through the communication request control portion 1111. Receiving this reception report, the communication request control portion 1111 transfers the reception data 1350 of the reception buffer 1320 to the area inside the buffer 1120 corresponding to the party that generates the reception request, such as the network data access portion 1220 or the network file system portion 1100.

The structure shown in FIG. 31 makes it possible to directly transfer the data of the buffer 1120 to the network 300 at the time of transmission and to reduce the overhead of transmission.

Figure 33:
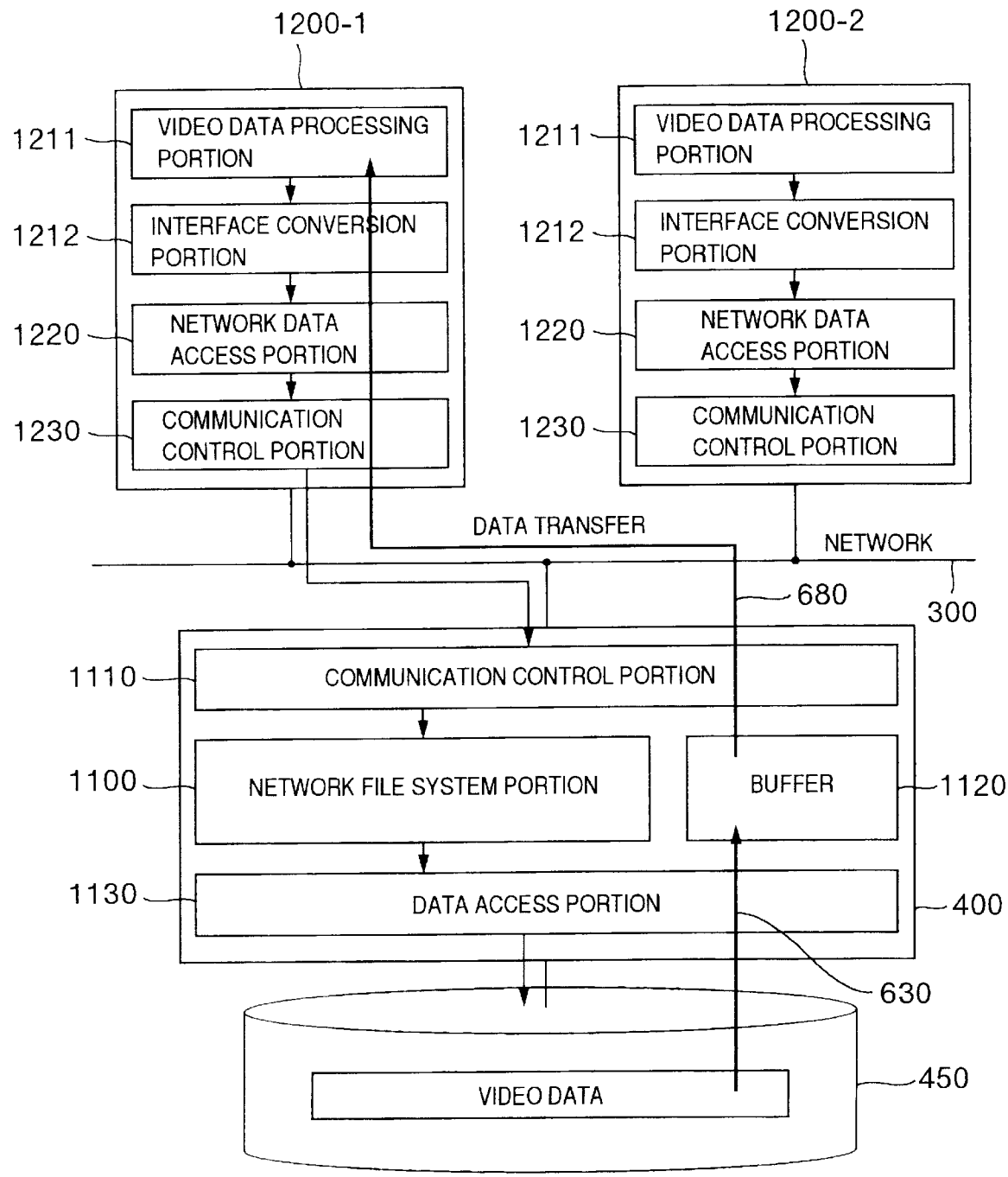
FIG. 33 is a block diagram showing the construction of a computer network system according to the fourth embodiment of the present invention.

FIG. 33 shows a structural example of the fifth embodiment of the present invention. In this embodiment, an interface conversion portion 1212 is interposed between the video data processing portion 1211 of the client 1200 and the network data access portion 1220 in addition to the structure of the fourth embodiment. The interface conversion portion 1212 enables the video data processing portion 1211 to gain access to the server 400 by using a standard interface (which is ordinarily used). For this purpose, the interface conversion 1212 converts the request using the standard interface generated from the video data processing portion 1211 to the interface of the network data access portion 1220.

According to this structure, a variety of video data processing portions of various manufacturers can be used for the video data processing portion 1211 and the client/server system (CSS) can be constituted in an open environment.

Figure 34:
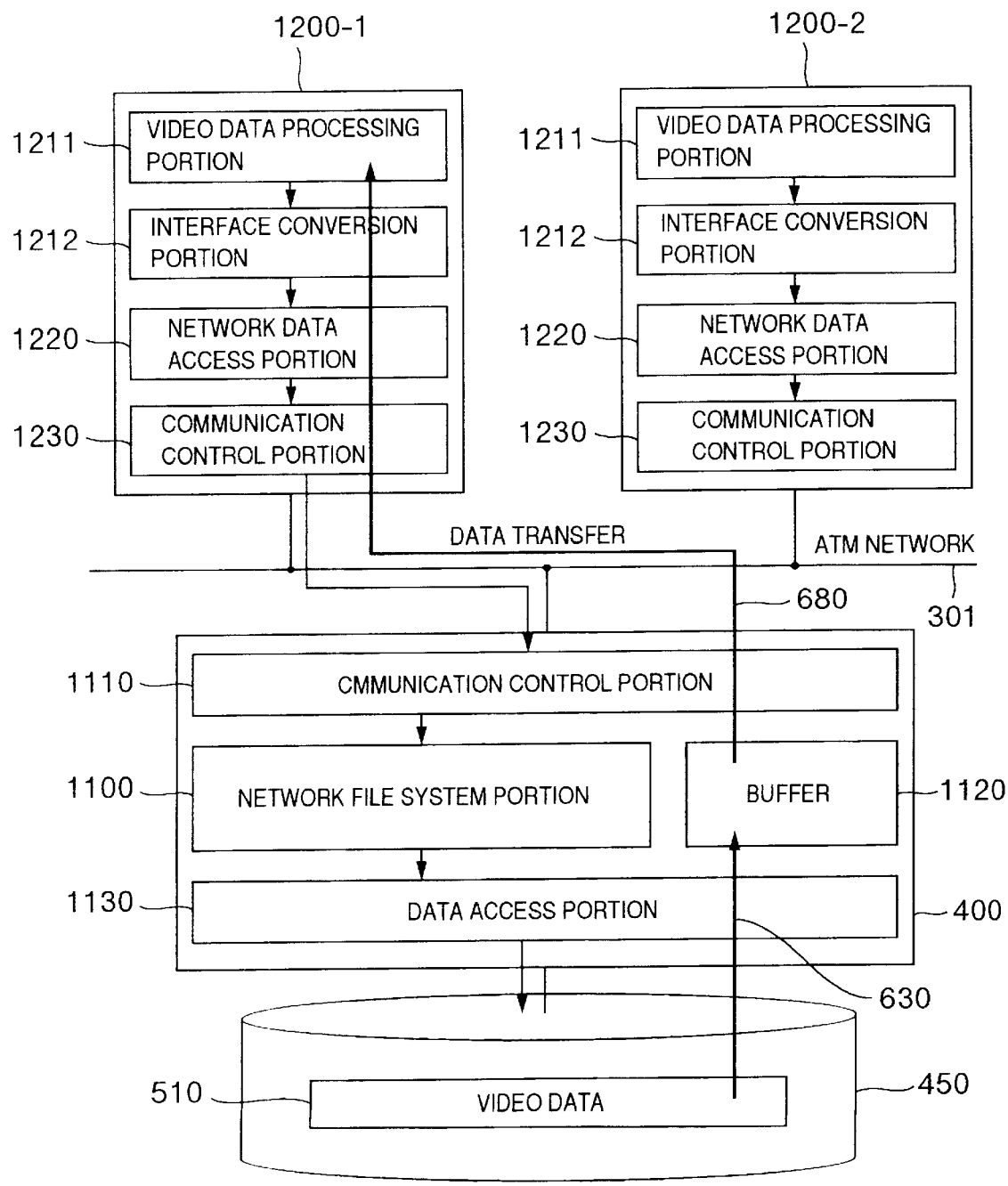
FIG. 34 is a block diagram showing a structure of a computer network system according to the sixth embodiment of the present invention.

FIG. 34 shows a structural example of the sixth embodiment of the present invention. In the sixth embodiment of the present invention, the network 300 of the fourth embodiment comprises a network 301 using an asynchronous transfer mode (ATM) protocol. Since the ATM can guarantee the band, the data transfer which must transfer the data within a predetermined time such as the video data can be made with high reliability by using the ATM.

Because the transfer rate can be improved and the access to the video data within a predetermined time becomes possible according to the present invention as described above, the network file server of the CSS type digital studio equipment, etc., can be accomplished. Therefore, this network file server can be utilized by using the standard interface, and the network file server can be provided in the open platform.

What is claimed is:

1. A network file server connected to at least one client through a network, comprising:
   a secondary storage device; and
   a computer connected to said secondary storage device through an input/output bus;
   wherein said computer includes:
   a main storage device connected to said secondary storage device through said input/output bus;
   a central processing unit connected to said secondary storage device and to said main storage device through said input/output bus; and
   a communication controller, connected to said main storage device through said input/output bus and connected to said at least one client through said network, which accepts a file access request sent from said at least one client through said network and transfers information on a plurality of addresses of said main storage device as one packet to said at least one client;
   wherein said main storage device includes:
   a buffer;
   a file access request control portion which accepts a file access request sent from said communication controller through said input/output bus to thereby allocate an area of said buffer for storing data corresponding to said file access request in accordance with said file access request, and generates an access request to a secondary storage device access control portion and supplies a communication request to a data transfer control portion thereby to execute data transfer between said communication controller and said secondary storage device;
   said secondary storage device access control portion reading out data from said secondary storage device in accordance with said access request from said file access request control portion and transferring the data thus read to the allocated area of said buffer through said input/output bus; and
   said data transfer control portion generating a header for said data of the allocated area of said buffer on the basis of said communication request from said file access request control portion, sending an address of said header thus generated and a size thereof and an address of said data of the allocated area of said buffer and a size thereof to said communication controller through said input/output bus and generating a communication request to said communication controller so that said header and said data can be collectively transferred to said at least one client; and
   wherein said communication controller reads out said data in the allocated area of said buffer in accordance with said communication request from said data transfer control portion, reads out said header generated by said data transfer control portion, generates one packet from said data and said header thus read out on the basis of the address of said header and said size thereof and the address of said data and said size thereof from said data transfer control portion and transfers said packet to said client through said network.

2. A network file server according to claim 1, wherein at least one of said file access request processing portion and said data transfer control portion includes, as a table for executing data transfer of said information of said main storage device through said communication controller, a data transfer information table which stores a logical address managed by an operating system of said central processing unit for the information of said main storage device, a physical address for said information of said main storage device, a data size of said information of said main storage device and a pointer for a next table, on the basis of said file access request, and
   said data transfer control portion transfers the address of said header and the size thereof and the address of said data of said allocated area of said buffer and the size thereof to said communication controller on the basis of said data transfer information table.

3. A network file server according to claim 1, wherein said file access request processing portion includes a first data transfer information table for storing logical addresses managed by an operating system of said central processing unit for said data inside the allocated area, physical addresses for said data inside the allocated area, the data size of said data inside the allocated area and a pointer for a next table, on the basis of said file access request, as a first table for executing the data transfer of said one packet through said communication controller, said data transfer control portion includes a second data transfer information table for storing logical addresses managed by an operating system of said central processing unit for said header, physical addresses for said header, the data size of said header and a pointer for said first data transfer information table, as a second table for executing the data transfer of said one packet through said communication controller, and said data transfer control portion transfers the address of said header and its size and the address of said data inside the allocated area of said buffer and its size to said communication controller on the basis of said first and second data transfer information tables.

4. A network file server according to claim 1, wherein a plurality of clients are connected to said network, and said buffer and said file access request control portion of said main storage device are disposed for each of said clients.

5. A network file server according to claim 4, wherein said main storage device further includes a file access exclusion control portion for keeping consistency of data between said buffers disposed for a plurality of said clients.

6. A network file server according to claim 1, wherein a plurality of clients are connected to said network, and said main storage device includes a file access request processing portion activation portion for accepting the connection request sent from one of said clients through said network and said communication controller, secures an area inside said buffer corresponding to said one client when said one client can be connected to said network file server for said connection request, and generates said file access request processing portion.

7. A network file server according to claim 6, wherein said main storage device further includes a resource table for managing resources of said network file server, and said file access request processing portion activation portion judges whether or not said one client can be connected to said network file server for said connection request by looking up said resource table when it receives said connected request from said one client.

8. A network file server according to claim 7, wherein said resource table has information on a maximum data transfer band of said network file server and information on a band used at present, and said file access request processing portion activation portion judges whether or not said one client can be connected to said network file server by looking up said resource table on the basis of the required band of said one client represented by said connection request when it receives said connection request from said one client.

9. A network file server connected to at least one client through a network, comprising:
a secondary storage device; and
a computer connected to said secondary storage device through an input/output bus;
wherein said computer includes:
a main storage device connected to said secondary storage device through said input/output bus, and having a buffer;
a central processing unit connected to said secondary storage device and to said main storage device through said input/output bus;
a control portion connected to said secondary storage device and to said main storage device through said input/output bus; and
a communication controller for transferring data to said at least one client, connected to said main storage device and said control portion through said input/output bus, connected to said at least one client through said network, accepting a file access request sent from said at least one client through said network and sending information on a plurality of addresses inside said main storage device as one packet to said at least one client;
wherein said control portion includes:
a file access request control portion for accepting the file access request sent from said communication controller through said input/output bus, allocating an area inside said buffer for storing data corresponding to said file access request in accordance with said file access request, generating an access request to a secondary storage device access control portion, giving a communication request to a data transfer control portion and executing the data transfer between said communication controller and said secondary storage device;
said secondary storage device access control portion reading out the data from said secondary storage device in accordance with said access request from said file access request control portion and transferring the data to said allocated area of said buffer through said input/output bus; and
said data transfer control portion generating a header for said data inside said allocated area of said buffer on the basis of said communication request from said file access request controller, sending the address of said header so generated and its size and the address of said data inside said allocated area of said buffer and its size to said communication controller through said input/output bus, and generating a communication request for said communication controller so that said header and said data can be collectively transferred to said at least one client; and
wherein said communication controller reads out said data inside said allocated area of said buffer in accordance with said communication request from said data transfer control portion, reads out said header generated by said data transfer control portion, generates one packet from said data and said packet so read out on the basis of the address of said header and its size and the address of said data and its size from said data transfer control portion, and executes the data transfer to said client through said network.

10. A network file server according to claim 9, wherein at least one of said file access request processing portion and said data transfer control portion includes a data transfer information table for storing logical addresses managed by an operating system of said central processing unit for said information inside said main storage device, physical addresses for said information inside said main storage device, the data size of said information inside said main storage device and a pointer for a next table as a table for executing the data transfer of said information inside said main storage device through said communication controller on the basis of said file access request, and said data transfer control portion sends the address and the size of said data header and the address and the size of said data inside said allocated area of said buffer to said communication controller on the basis of said data transfer information table.

11. A network file server according to claim 9, wherein said file access request processing portion includes a first data transfer information table for storing logical addresses managed by an operating system of said central processing unit for said data inside said allocated area, physical addresses for said data inside said allocated area, the data size of said data inside said allocated area and a pointer for a next table, as a first table for executing the data transfer of said one packet through said communication controller, on the basis of said file access request;

wherein said data transfer control portion includes a second data transfer information table for storing physical addresses managed by said operating system of said central processing unit for said header, physical addresses for said header, the data size of said header and a pointer for said first data transfer information table, as a second table for executing the data transfer of said one packet through said communication controller; and wherein said data transfer control portion sends the address of said header and its size and the address of said data inside said allocated area of said buffer and its size to said communication controller on the basis of said first and second data transfer information tables.

12. A computer network system comprising:

a network file server;

a network connected to said network file server; and at least one client connected to said network file server through said network;

wherein said network file server includes:

a secondary storage device; and a computer connected to said secondary storage device through an input/output bus;

wherein said computer includes:

a main storage device connected to said secondary storage device through said input/output bus, and having a buffer;

a central processing unit connected to said secondary storage device and to said main storage device through said input/output bus;

a control portion connected to said secondary storage device and to said main storage device through said input/output bus; and a communication controller connected to said main storage device and to said control portion through said input/output bus, connected to said at least one client through said network, accepting a file access request sent from said at least one client through said network and executing the data transfer of information of a plurality of addresses inside said main storage device as one packet to said at least one client;

wherein said control portion includes:

a file access request control portion for accepting the file access request sent from said communication controller through said input/output bus, allocating an area inside said buffer for storing data corresponding to said file access request in accordance with said file access request, generating an access request for a secondary storage device access control portion, giving a communication request to a data transfer control portion and executing the data transfer between said communication controller and said secondary storage device;

said secondary storage device access control portion reading out the data from said secondary storage device in accordance with said access request from said file access request control portion and transferring the data to the allocated area of said buffer through said input/output bus; and said data transfer control portion generating a header for said data inside the allocated area of said buffer on the basis of said communication request from said file access request control portion, sending the address of said header so generated and its size and the address of said data inside said allocated area of said buffer and its size to said communication controller through said input/output bus and generating a communication request to said communication controller so that said header and said data can be collectively transferred to said at least one client; and wherein:

said communication controller reads out said data inside the allocated area of said buffer in accordance with said communication request from said data transfer control portion, reads out said header generated by said transfer control portion, generates one packet from the address of said header and its size and the address of said data and its size from said data transfer control portion and executes the data transfer to said client through said network.

13. A computer network system according to claim 12, wherein at least one of said file access request processing portion and said data transfer control portion of said control portion includes a data transfer information table for storing logical addresses managed by an operating system of said central processing unit for said information inside said main storage device, physical addresses for said information inside said main storage device, a data size of said information inside said main storage device and a pointer for a next table as a table for executing the data transfer of said information inside said main storage device through said communication controller on the basis of said file access request, and said data transfer control portion sends the address of said header and its size and the address of said data inside said allocated area of said buffer and its size to said communication controller.

14. A computer network system according to claim 12, wherein said file access request processing portion of said control portion includes a first data transfer information table for storing logical addresses managed by an operating system of said central processing unit for said data inside said allocated area, physical addresses for said data inside said allocated area, the data size of said data inside said allocated area and a pointer for a next table as a first table for executing the data transfer of said one packet through said communication controller, on the basis of said file access request, said data transfer control portion includes a second data transfer information table for storing logical addresses managed by an operating system of said central processing unit for said header, physical addresses for said header, the data size of said header and a pointer for said first data transfer information table, as a second table for executing the data transfer of said one packet through said communication controller, and said data transfer control portion sends the address of said header and its size and the address of said data inside said allocated area of said buffer and its size to said communication controller on the basis of said first and second data transfer information tables.

15. A network file server comprising a computer including a communication controller connected to at least one client through a network, a main storage device having a buffer, a central processing unit and an input/output bus for mutually connecting said communication controller, said central processing unit and said main storage device, and a secondary storage device connected to said computer, said main storage device reading data corresponding to a file access request from said secondary storage device and storing said data in said buffer when said main storage device accepts said file access request sent from said at least one client through said network and through said communication controller, said communication controller looking up a table portion and transferring the data stored in said buffer as one packet to said at least one client;

wherein said table portion includes:

a first data transfer information table for storing physical addresses managed by an operating system of said central processing unit for said data stored in said buffer, physical addresses for said data, the data size of said data and a pointer for a next table on the basis of said file access request; and a second data transfer information table for storing physical addresses managed by the operating system of said central processing unit for a header of said data, physical addresses for said header, the data size of said header and a pointer for said first data transfer information table.

16. A computer program embodied on a computer-readable medium for use in a network file server comprising a computer including a communication controller connected to at least one client through said network and executing the data transfer of information on a plurality of addresses in a main storage device as one packet to said at least one client, said main storage device having a buffer, a central processing unit and an input/output bus for mutually connecting said communication controller, said central processing unit and said main storage device, and a secondary storage device connected to said computer, including:

a) program code means for allocating an area for storing data corresponding to an access request into said buffer of said main storage device when said access request is generated from said client;

b) program code means for reading out the data corresponding to said access request from said secondary storage device, transferring the data to said buffer and storing the data in said allocated area;

c) program code means for generating a header for said data inside said allocated area in said buffer, the address of said header and its size and the address of said data and its size in said main storage device on the basis of said access request; and d) program code means for executing the data transfer of said data inside said allocated area of said area as one packet to said at least one client by said communication controller by reporting the address of said header and its size and the address of said data and its size to said communication controller.

17. A data transfer controlling method in a network file server comprising a computer including a communication controller connected to at least one client through a network and executing data transfer of information on a plurality of addresses inside a main storage device as one packet to said at least one client, a main storage device having a buffer, a central processing unit and an input/output bus for mutually connecting said communication controller, said central processing unit and said main storage device, and a secondary storage device connected to said computer, said data transfer controlling method comprising the steps of:

a) allocating an area for storing data corresponding to an access request into said buffer of said main storage device when said client generates said access request;

b) reading the data corresponding to said access request from said secondary storage device, transferring said data to said buffer and storing said data in said allocated area;

c) generating a header for said data in said allocated area of said buffer, the address of said header and its size and the address of said data and its size inside said main storage device on the basis of said access request; and d) reporting the address of said header and its address and the address of said data and its address to said communication controller and transferring by said communication controller said data inside said allocated area of said buffer as one packet to said at least one client.

18. A data transfer controlling method in a network file server according to claim 17, wherein said step c) generates a data transfer information table for storing logical addresses managed by an operating system of said central processing unit for said information in said main storage device, physical addresses for said information in said main storage device, a data size of said information inside said main storage device and a pointer for a next table, and said step d) reports the address of said header and its size and the address of said data and its size to said communication controller by using said data transfer information table.

19. A data transfer controlling method in a network file server according to claim 17, wherein said step c) generates a data transfer information table for storing logical addresses managed by an operating system of said central processing unit for said data in said allocated area of said buffer in said main storage device, physical addresses for said data inside said main storage device, the data size of said data and a pointer for a next table and generates a second data transfer information table for storing logical addresses managed by the operating system of said central processing unit for said header, physical addresses for said header, the data size of said header and a pointer for storing said first data transfer information table, and said step d) reports the address of said header and its size and the address of said data and its size to said communication controller by using said first and second data transfer information table.

20. A data transfer controlling method in a network file server according to claim 17, wherein a plurality of clients are connected to said network, said buffer of said main storage device is disposed for each of said clients, and said step a) allocates an area for storing data in one of a plurality of said buffers corresponding to one client in response to an access request from said one client among a plurality of said clients.

21. A data transfer controlling method in a network file server according to claim 20, wherein said step a) invalidates the data of said buffer to which access is made previously when access is made to the same data between said buffers disposed for said clients, so as to thereby keep consistency of data between said buffers.

22. A data transfer controlling method in a network file server according to claim 17, wherein a plurality of clients are connected to said network, and said data transfer control method further comprises the step of:

e) securing an area inside said buffer in such a manner as to correspond to one client when said one client among a plurality of said clients generates a connection request through said network and through said communication controller and when said one client can be connected to said network file server in response to said connection request.

23. A data transfer controlling method in a network file server according to claim 22, wherein said main storage device includes a resource table for managing resources of said network file server, and said step e) looks up said resource table and judges whether or not said one client can be connected to said network file server in response to said connection request when said one client generates said connection request.

24. A data transfer controlling method in a network file server according to claim 23, wherein said resource table has information on a maximum data transfer band of said network file server and a band used at present, and said step e) looks up said resource table and judges whether or not said one client can be connected to said network file server in response to said connection request when said one client generates said connection request.

* * * * *